United States Patent [19]

Woods et al.

[11] Patent Number: 4,621,503
[45] Date of Patent: Nov. 11, 1986

[54] PRESSURE SENSING DEVICES AND METHODS, CONTROL DEVICES AND METHODS OF OPERATING SAME, SMART PRESSURE SWITCHES, AIR CONDITIONING SYSTEMS AND DEVICES FOR CONTROLLING SAME

[75] Inventors: Lee O. Woods; Ronald L. Hilty, both of Morrison, Ill.; William P. Kornrumpf, Albany, N.Y.

[73] Assignee: General Electric Company, Fort Wayne, Ind.

[21] Appl. No.: 791,805

[22] Filed: Oct. 28, 1985

Related U.S. Application Data

[63] Continuation of Ser. No. 596,818, Apr. 4, 1984, abandoned.

[51] Int. Cl.[4] ............................. F25B 1/00; G01L 1/12
[52] U.S. Cl. ..................................... 62/228.3; 73/728; 73/862.69; 336/20
[58] Field of Search ..................... 73/722, 862.69, 728; 324/209; 336/20; 62/228.3

[56] References Cited

U.S. PATENT DOCUMENTS

| Re. 26,739 | 12/1969 | Stucki . | |
|---|---|---|---|
| 2,943,458 | 7/1960 | Cohea | 62/228.3 X |
| 3,424,007 | 1/1969 | Pasnak et al. | 73/398 |
| 3,681,982 | 8/1972 | Hiratsuka et al. | 73/141 A |
| 3,940,992 | 3/1976 | Jost et al. | 73/398 |
| 4,011,758 | 3/1977 | Reenstra et al. | 73/393 |
| 4,158,368 | 6/1979 | Clark | 137/487.5 |
| 4,235,368 | 11/1980 | Neel | 236/46 R |
| 4,351,105 | 9/1982 | Poling | 29/622 |
| 4,368,447 | 1/1983 | Inomata et al. | 336/20 |
| 4,374,665 | 2/1983 | Koon | 75/123 |
| 4,463,576 | 8/1984 | Burnett et al. | 62/228.3 |

FOREIGN PATENT DOCUMENTS

| 625249 | 6/1949 | United Kingdom . |
| 684462 | 12/1952 | United Kingdom . |
| 971506 | 9/1964 | United Kingdom . |
| 1048105 | 11/1966 | United Kingdom . |
| 1070693 | 6/1967 | United Kingdom . |
| 1168861 | 10/1969 | United Kingdom . |
| 1211430 | 11/1970 | United Kingdom . |

OTHER PUBLICATIONS

"Smart Sensors", by W. G. Wolber, SAE Technical Paper Series, 1983, pp. 1–10.

*Primary Examiner*—William E. Wayner
*Attorney, Agent, or Firm*—John M. Stoudt

[57] ABSTRACT

A device for sensing pressure at a source thereof comprising a housing with a fluid pressure responsive diaphragm movable therein for defining therewith an expansible chamber for communication with the source of pressure the magnitude of which is to be sensed, and a transducer. The transducer includes a body of magnetoelastic material of generally annular form positioned within the housing and having magnetic properties which vary as a function of the stress to which the body is subjected in response to movement of the diaphragm. Electrical circuitry responds to stress-induced changes in the magnetic properties to produce an electrical signal having a value which is a function of the magnitude of the fluid pressure. The device includes an actuator, which is movable with the diaphragm, for accepting and retaining a sector of the annular body and a cradle generally fixed in relation to the housing for accepting and retaining a diametrically opposite sector of the annular body. An increase in the fluid pressure in the expansible chamber tends to compress the annular body between the actuator and the cradle. A smart pressure switch including logic circuitry and the pressure sensing device, air conditioning systems incorporating such sensing and control devices, and methods of sensing pressure and controlling the operation of air conditioning systems are also described.

53 Claims, 34 Drawing Figures

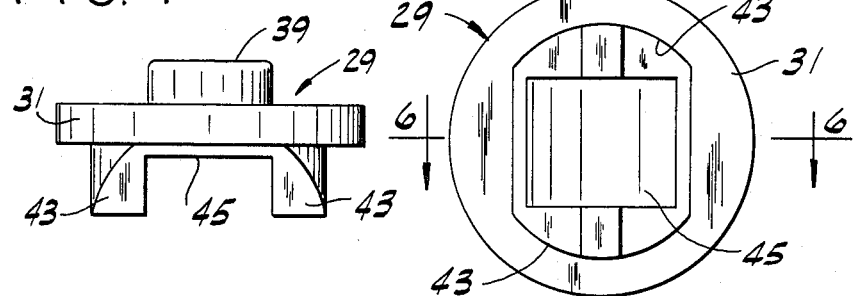
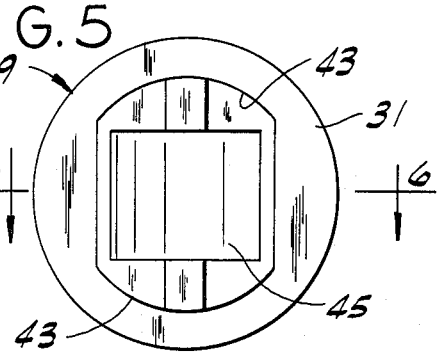
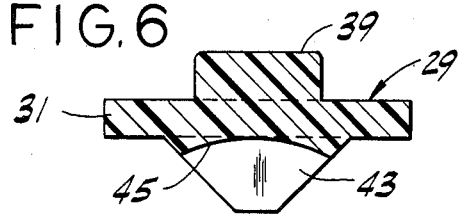
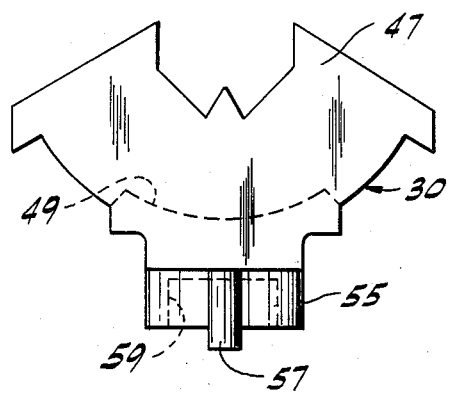
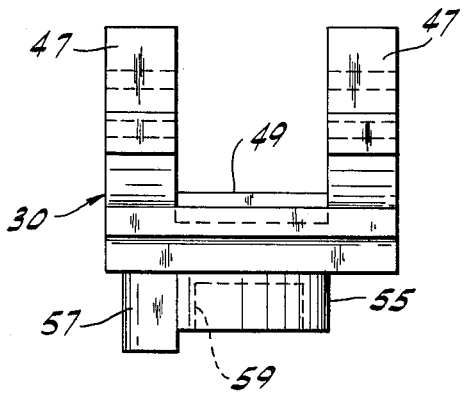
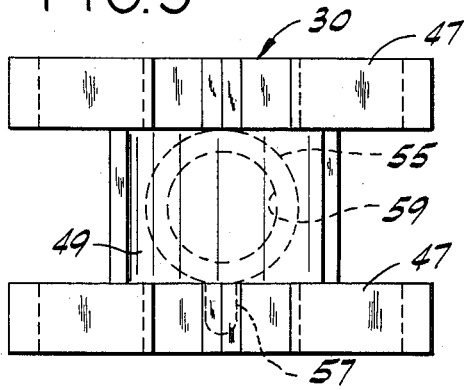

PRESSURE SENSING DEVICES AND METHODS, CONTROL DEVICES AND METHODS OF OPERATING SAME, SMART PRESSURE SWITCHES, AIR CONDITIONING SYSTEMS AND DEVICES FOR CONTROLLING SAME

CROSS REFERENCE TO RELATED APPLICATIONS

This application is a continuation-in-whole of the commonly assigned original application Ser. No. 596,818 now abandoned filed Apr. 4, 1984 which is incorporated herein by reference, and both this application and such original application are related to the commonly assigned applications of William P. Kornrumpf and Robert P. Alley, Ser. No. 546,228, filed Oct. 27, 1983 now U.S. Pat. No. 4,541,288 and William P. Kornrumpf and William J. Laughton, Ser. No. 596,831, now U.S. Pat. No. 4,561,261, filed Apr. 4, 1984 and entitled Control Apparatus and Methods, Heat Transfer Systems and Apparatus and Methods for Controlling Such Systems and for Sensing and Indicating Low Fluid Charge Conditions Therein, the entire disclosures of such related applications being incorporated herein by reference.

BACKGROUND OF THE INVENTION

This invention generally relates to pressure sensing and pressure responsive controls and more particularly to pressure sensing devices and methods, control devices and methods of operating same, smart pressure switches, air conditioning systems and devices for controlling such systems.

As fluid pressures must be monitored and controlled in many different systems, various pressure sensors have been developed for this purpose. For example, in air conditioning systems, control devices have been used to sense refrigerant pressures at one or more selected points within the system and to use such sensed pressure values to control the operation of the system. One of the aforementioned control devices in wide use for this purpose is a pressure activated or pressure sensing switch as shown in U.S. Pat. No. 4,351,105. That pressure sensing switch is responsive to the refrigerant pressure in the suction line of an automotive air conditioner increasing to a predetermined value wherein a snap-action member would move from one configuration to another one to actuate switch contacts, and when the refrigerant pressure decreases to a second lower predetermined value, the snap-action member would return to its original configuration and move the switch contacts back to their original mode thereby to control the energization of the compressor. This is an effective pressure sensing and control device for the particular predetermined pressure to which one calibrates or adjusts the device and for its particular pressure differential. As more sophisticated control systems have been developed, a need has arisen for a pressure sensor which can be programmed to respond to any one or more of a number of different preselected pressures to provide various desired control functions. Since the temperatures and fluid pressures encountered by the various components of an automotive air conditioning system can vary widely dependent, for example, upon engine speed and engine and climatic temperatures, it is desirable that control functions for the system be provided by pressure sensors which are relatively unaffected by the temperature of the surroundings in which they must operate and which are rugged and reliable.

SUMMARY OF THE INVENTION

Among the several objects of the invention may be noted the provision of improved pressure sensing and control devices which accurately monitor fluid pressures on a continuous basis and which may be programmed to effect one or more desired control functions at any one or more preselected pressures; the provision of an improved smart pressure switch which will directly control electrical apparatus in response to the pressure being monitored reaching any one or more preselected values and may be used to energize and deenergize an electrical device, such as for instance an electrically actuated clutch for the compressor of such improved an automotive air conditioning system; the provision of pressure sensing devices and smart pressure switches the calibration of which is substantially unaffected by ambient temperature changes; the provision of such devices and switches which are sensitive to small changes in pressures; the provision of improved air conditioning systems in which control functions are performed by such devices and switches; the provision of improved methods for sensing fluid pressures accurately; the provision of improved methods for controlling the operation of air conditioning systems by such devices and switches; the provision of an improved method for operating a fluid pressure control device; the provision of an improved method of assembling a control device; and the provision of such improved devices and switches which are compact in size, economical to manufacture, rugged in construction, and reliable, sensitive and accurate in operation. These as well as other objects and advantageous features of the present invention will be in part apparent and in part pointed out hereinafter.

In general and in one form of this invention a device for sensing pressure at a source thereof comprises a housing with fluid pressure responsive means movable therein for defining therewith an expansible chamber for communication with the pressure source. Positioned within the housing is a transducer comprising a body of magnetoelastic material of generally annular form having magnetic properties which vary as a function of the stress to which the body is subjected. The body is stressed in response to movement of the fluid pressure responsive means and includes means responsive to the stress-induced changes in the magnetic properties thereof for producing an electrical signal having a value which is a function of the magnitude of the fluid pressure. Means for accepting and retaining a sector of the annular body is movable with the fluid pressure responsive means. A cradle generally fixed in relation to the housing accepts and retains a diametrically opposite sector of the annular body. An increase in the fluid pressure in the expansible chamber tends to compress the annular body between the accepting and retaining means and said cradle.

Also in general, a control device in one form of the invention has a housing, and an assembly is removably associated with the housing therewithin. The assembly includes a transducer body of magnetoelastic material having magnetic properties variable as a function of stress imparted thereto, means removably mounted in the housing for cradling a part of the transducer body, and coil means wound about at least a part of the cradling means and the transducer body disposed in the cradling means for retaining the transducer body and the cradling means against displacement and operable generally for producing an electrical signal indicative of the stressing of the transducer body when stress is imparted thereto.

Further in general and in one form of the invention, a method is provided for assembling a control device with the control device including at least a housing, a cradle, a body of magnetoelastic material, and an insulated conductor. In the practice of this method, the cradle is associated with a part of the magnetoelastic material body. A part of the insulated conductor is coiled about at least a part of the cradle and the magnetoelastic material body part associated therewith, and thereby the cradle and the magnetoelastic material body are retained against displacement. The cradle, the magnetoelastic material body and the insulated conductor cradled about the at least part of the cradle and the magnetoelastic material body associated therewith are placed in a mounted position therefor in the housing.

Still in general and in one form of the invention a smart pressure switch for sensing pressure at a fluid pressure source comprises a housing with fluid pressure responsive means movable therein for defining therewith an expansible chamber for communication with the pressure source and a transducer comprising a body of magnetoelastic material, the magnetic properties of which vary as a function of the stress to which the body is subjected. The body is stressed in response to the expansion and contraction of the expansible chamber and includes means responsive to the stress-induced changes in the magnetic properties thereof for producing an electrical signal having a value which is a function of the pressure. The body is mounted within the housing and associated with the fluid pressure responsive means so that an increase in pressure in the expansible chamber tends to compress the body. Electrical circuitry is provided within the housing comprising logic means responsive to the signal for controlling the conductivity of a solid state switching device, also within the housing, for selectively energizing and deenergizing electrical apparatus.

Generally and in a further form of the invention an air conditioning system comprises a compressor, electrically energizable means for driving the compressor, means for conducting refrigerant from the compressor, means for returning refrigerant to the compressor and a smart pressure switch. This switch has a housing with fluid pressure means movable therein for defining therewith an expansible chamber for communication with the returning means for sensing the magnitude of the refrigerant pressure therein and a transducer. The body comprises a body of magnetoelastic material, the magnetic properties of which vary as a function of the stress to which the body is subjected, the transducer being stressed in response to the expansion and contraction of the expansible chamber. The transducer includes means responsive to the stress-induced changes in the magnetic properties thereof for producing an electrical signal having a value which is a function of the refrigerant pressure in the returning means and is mounted within the housing and associated with the fluid pressure responsive means so that an increase in pressure in the expansible chamber tends to compress the body. The system also includes means responsive to the electrical signal attaining a first value representing a first predetermined pressure for energizing the electrically energizable means and thereafter reaching a second value representing a second predetermined but lower pressure for deenergizing the electrically energizable means.

In general and in yet another form of the invention a method of sensing pressure comprises connecting a source of fluid pressure to an expansible chamber defined by a fluid pressure responsive means movable within a housing and mounting within the housing a transducer comprising an annular body of magnetoelastic material, the magnetic properties of which vary as a function of the stress to which the body is subjected. A sector of the annular body has applied thereto a compressive force which is a function of the pressure being sensed by positioning the annular body between means which receives and retains a sector of the body and is associated with the fluid pressure responsive means and means for receiving and retaining a diametrically opposite sector of the annular body and which is held fixed within the housing thereby to stress the body by a force which is a function of the pressure being sensed. An electrical signal is produced having a value which is a function of the pressure in response to the stress-induced changes in the magnetic properties of the annular body.

Also in general and in another form of the invention a method of operating a control device including a generally annular body of magnetoelastic material having magnetic properties which vary in response to stress-induced changes therein to produce an electrical control signal, a pair of means associated with the body for receiving and retaining a pair of generally diametrically opposite sectors of the body, respectively, and means for transmitting an actuating force, comprises the following steps. The actuating force is applied onto the transmitting means and the transmitting means and one of the receiving and retaining means are moved generally conjointly in response to the application of the actuating force onto the transmitting means and exerting the actuating force in a generally diametrical direction onto one of the diametrically opposite sectors of the body associated with the one receiving and retaining means. The other of the diametrically opposite sectors of the body is urged against the other of the receiving and retaining means associated therewith in response to the exertion of the actuating force in the generally diametrical direction onto the one diametrically opposite sector of the body thereby compressing the body between the receiving and retaining means associated with the diametrically opposite sectors of the body. The body is stressed in response to the compression thereof to effect stress-induced changes in the magnetic properties of the magnetoelastic material of the body, and in response thereto in the magnetic properties the electrical control signal is produced as a function of the actuating force.

Generally and in still another form of the invention a method for controlling the operation of an air conditioning system having a compressor, means for driving the compressor, a pressure line for conducting compressed refrigerant from the compressor, and a suction line for returning expanded refrigerant to the compressor, comprises the steps of sensing the magnitude of the refrigerant pressure within the suction line by establishing communication between that line and an expansible chamber within a housing and stressing a body of magnetoelastic material mounted within the housing in response to the pressure in the expansible chamber, the body of magnetic material having magnetic properties which vary as a function of the stress to which the body is subjected. The changes in the magnetic properties of the body are sensed by means producing an electrical signal having a value which is a function of the pressure in the suction line. This electrical signal is applied to electrical circuitry within the housing, the electrical circuitry including a solid state switching device which in response to preselected pressures being sensed will selectively effect coupling or decoupling of the compressor and the means for driving it.

BRIEF DESCRIPTION OF THE DRAWINGS

FIGS. 4 and 5 are side and lower end elevational views, respectively, on an enlarged scale of an actuator component of the device of FIG. 1;

FIG. 6 is a sectional view taken along line 6—6 of FIG. 5;

FIGS. 7 and 8 are front and side elevational views, respectively, on an enlarged scale of a cradle component of the device of FIG. 1;

FIG. 9 is a top plan view of the cradle component of FIGS. 7 and 8;

Corresponding reference characters indicate corresponding parts throughout the several views of the drawings.

The exemplifications set out herein illustrate preferred embodiments of the invention in one form thereof, and such exemplifications are not to be construed as limiting the scope of the invention in any way.

DETAILED DESCRIPTION OF PREFERRED EMBODIMENTS

Figure 1:
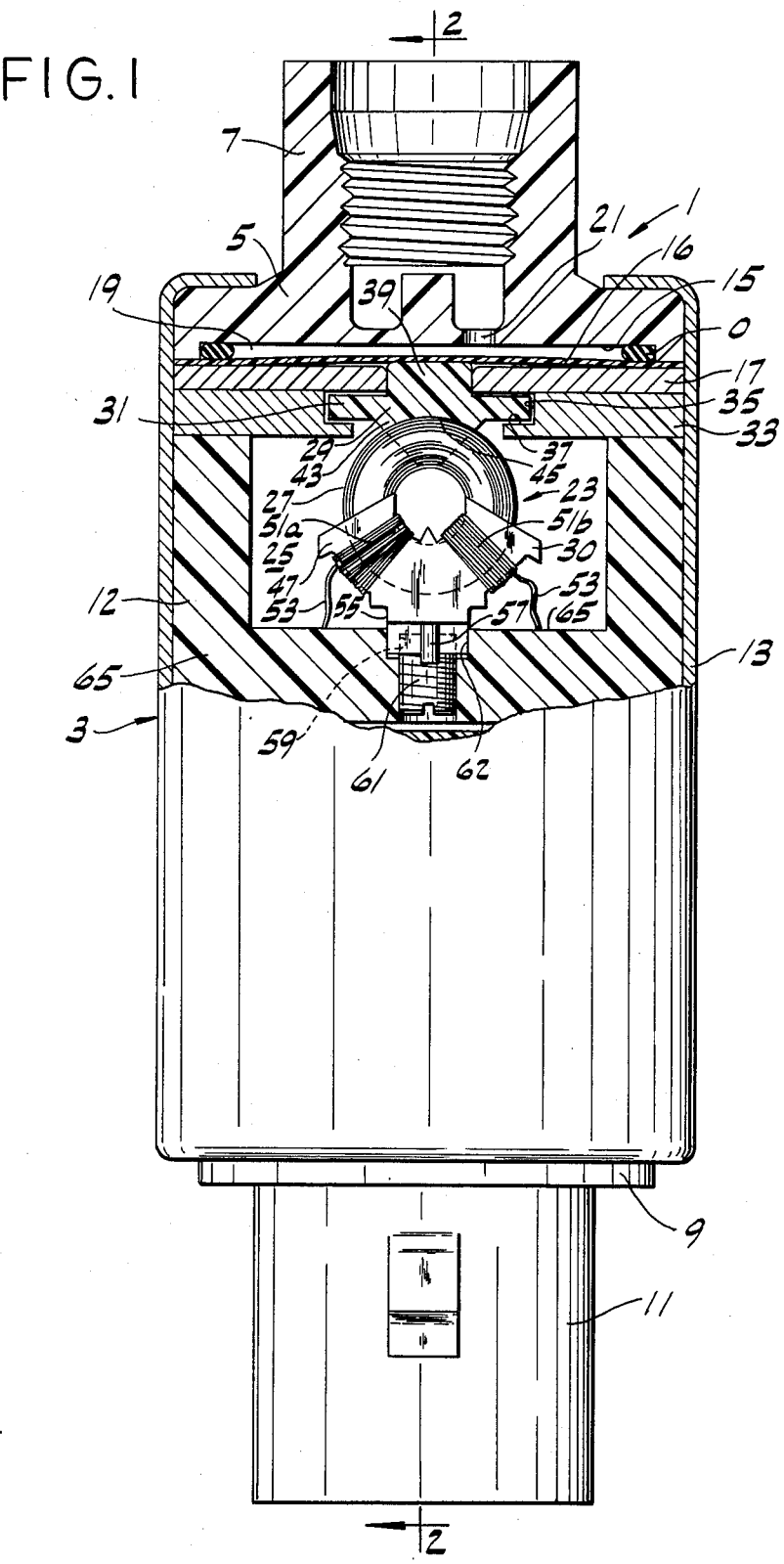
FIG. 1 is a front elevation view partially in cross-section of a pressure sensing and control device in one form of this invention and illustrates principles which may be practiced in methods in one form of this invention for pressure sensing for operating a control device, and for assembling a control device.
Figure 2:
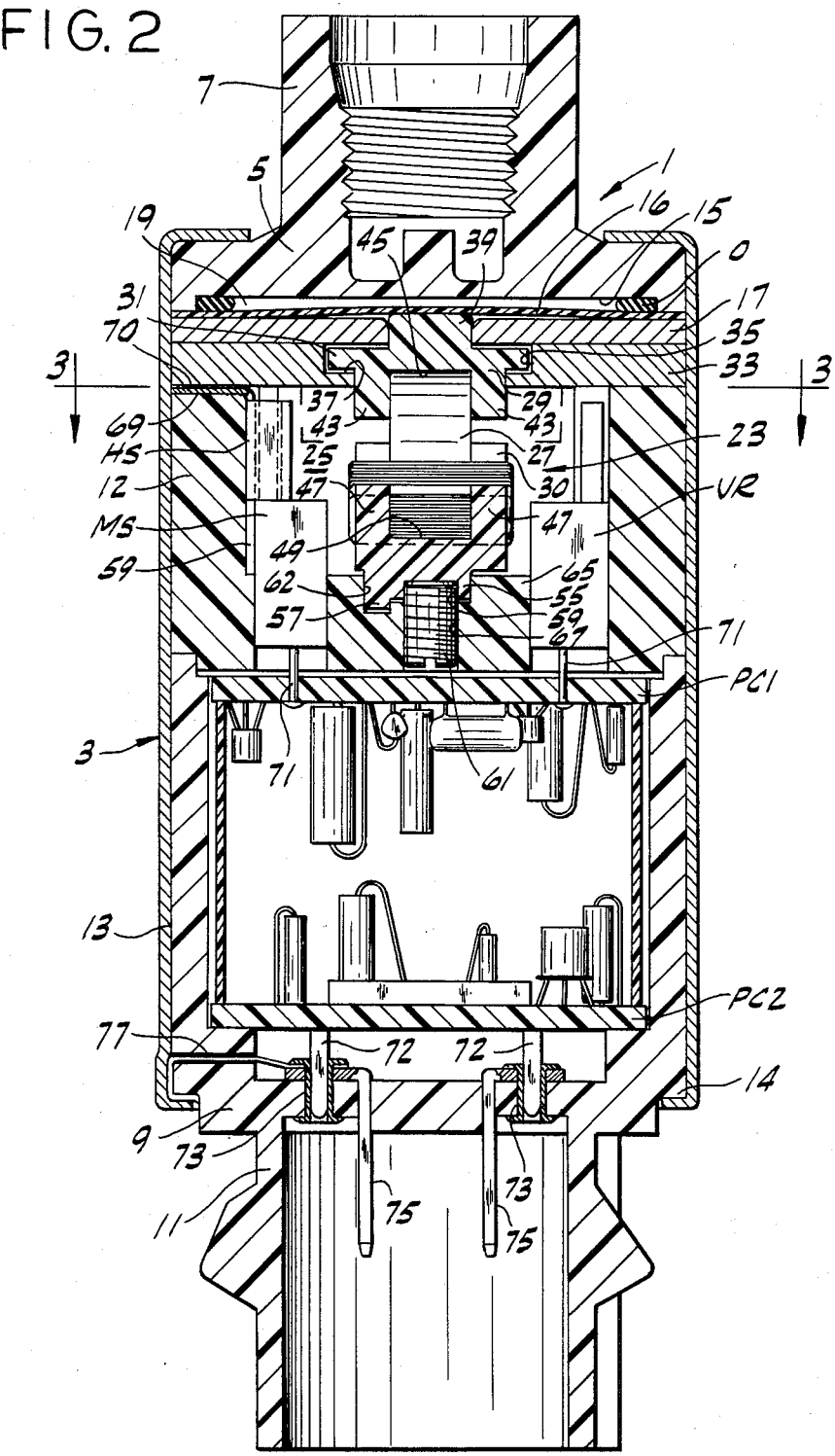
FIG. 2 is a sectional view taken along line 2—2 of FIG. 1.
Figure 3:
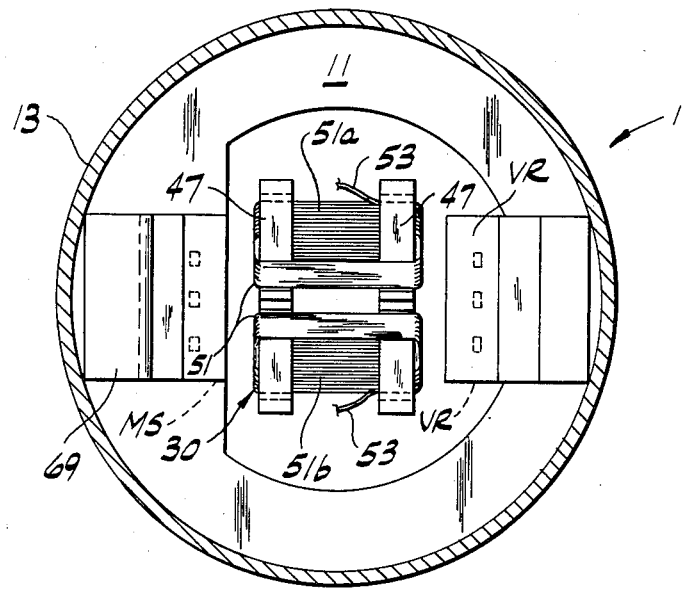
FIG. 3 is a sectional view taken along line 3—3 of FIG. 2.

Referring now to the drawings in general, and more particularly to FIGS. 1-3, there is shown at 1 a pressure sensing and control device in one form of the invention for use, for example, in an automotive air conditioning system in which operation of the system is controlled thereby. Pressure sensing and control device 1 comprises a smart pressure switch, i.e., one which has incorporated therein logic circuitry programmed to perform desired control functions in response to predetermined pressure conditions being sensed and to energize and deenergize electrical apparatus, such as for example the electromagnetic clutch of an automotive air conditioning compressor. Device 1 comprises an enclosure or housing 3 including a pressure head 5 or upper housing portion having an integral internally threaded hex nut 7 forming a port and adapted to be threadably received on a nipple (not shown) supplying a source of fluid pressure, a lower housing portion 9 having a socket 11 for receiving a multiterminal electrical plug (not shown), and an intermediate or base portion 12. The housing portions are secured together by a generally cylindrical retaining collar or sleeve 13, which may be formed, if desired, of steel and has the end margins thereof rolled over to grippingly engage the peripheral portion of head 5 and a projecting shoulder 14 of lower housing portion 9. Head 5 and the lower housing portion 9 may, if desired, be formed from a suitable dielectric material such as a molded synthetic resin, for example, a polyester resin available commercially under the trade designation "Valox 420" from General Electric Company, Engineering Polymer Product Department.

Pressure head 5 has a recessed undersurface 15 in which suitable sealing means, such as an O-ring O or the like for instance, is fitted. A thin flexible or resilient diaphragm or diaphragm means 16, which may, if desired, be formed from "Kapton", commercially available from DuPont de Nemours of Wilmington, Del., has a peripheral or circumferential portion thereof sandwiched between pressure head 5 and an abutment or abutment means, such as for instance a support washer 17, with O-ring O forming a resilient peripheral seal. Thus an expansible chamber 19 is formed between the recessed undersurface of pressure head 5 and diaphragm 16, said diaphragm comprising fluid pressure responsive means or force transmitting means. Fluid pressure communication between chamber 19 and the source of fluid pressure supplied to the port is provided by a passage 21 in head 5. Although housing 3 and its component parts discussed above are illustrated herein for purposes of disclosure, it is contemplated that other housings and component parts having various other configurations and formed of various other materials may be utilized within the scope of the invention so as to meet at least some of the objects thereof.

A transducer generally indicated at 23 is positioned within another compartment or chamber 25 of the housing, which is preferably at ambient pressure. The transducer comprises a generally annular body or core 27 having inner and outer circumferential surfaces interconnected by a pair of generally radially extending opposite side edge portions, as best seen in FIGS. 1 and 2, and the core is formed of magnetoelastic material, such as for instance silicon steel or an amorphous metal alloy or the like. This core may consist of a preselected number of turns of amorphous metal alloy tape, for example, one hundred turns of 1 mil. thick (0.025 mm.) and 0.200" wide (5.1 mm.), the outer end of which may be secured by suitable means, such as for instance an adhesive bonding tape or the like (not shown), and is preferably annealed after winding. As best seen in FIGS. 1 and 2, the aforementioned tape forming core 27 is spirally wound upon itself with a pair of opposite edges of the tape defining the aforementioned opposite side edge portions of the core. Annular core 27 is mounted between stress imparting or force exerting means, such as for instance a saddle-shaped pressure actuator 29, and a diametrically opposed cradle or cradling means 30 each having opposed recesses shaped to receive and retain confronting opposite sectors of core 27. Both actuator 29 and cradle 30 may be molded from a suitable material, such as for instance a synthetic resin material, for example, a polyphenylene sulfide resin reinforced with fiber glass available commercially under the trade designation "R4" from Phillips Petroleum Co. of Bartlesville, Okla.

Actuator 29 (FIGS. 4–6) has abutting engagement means, such as for instance a circular laterally projecting flange 31, which serves to hold the actuator captive, but with limited axial movement, between support washer 17 and a metallic stop washer 33 having a central recessed portion 35 which has a ledge 37 and in which the actuator is nested. Extension means, such as for instance a circular boss 39, projects outwardly from the outer actuator surface through a central correspondingly shaped aperture 41 in support washer 17 and extends beyond the outer surface thereof for contact with the central portion of the inner surface of diaphragm 16. Although boss 39 is illustrated as extending beyond the outer surface of washer 17, i.e., has positive proudness, it is to be understood that it need not so extend and could be flush with the outer surface of washer 17 or have negative proudness. Extending downwardly from the inner surface of actuator 31 are a pair of spaced tapered legs 43 which straddle the upper portion of core 27 and form a recess to accept and retain a sector of core 27. Actuator 29 has a concavely shaped undersurface portion 45 preferably having a curvature less than that of the annular core.

The lower portion or sector of core 27 is received between two spaced apart inwardly projecting sides or arms 47 of cradle 30. Cradle 30 (FIGS. 7–9) has a concavely shaped surface 49 on which rests the lower surface of a sector of core 27 and preferably has a curvature less than that of the annular core. Cradle sides 47 are shaped to comprise a bobbin on which is wound a coil 51 of the transducer 23. Coil or coil means 51 is shown as having two winding sections 51a and 51b with insulated conductors, such as for instance lead wires 53, for connection to electrical circuitry as will be described hereinafter. Extending in the opposite direction from cradle 30 is an annular boss 55 with a key portion 57. Boss 55 has a circular recess 59 which receives the end of a calibration or adjusting screw 61 comprising adjustment means or adjustably urging means. The opposite end of screw 61 is slotted for adjustment by a suitable tool, such as for instance a screwdriver or the like. Boss 55 and key 57 are received in a complimentary shaped recess 62 of a bridging portion 65 of base 12 and calibration screw 61 is threaded in a bore 67 in base portion 65. Annular core 27 is centrally positioned in chamber 25 with its upper sector being received and retained between the legs of actuator 29 and a diametrically opposite sector of annular core 27 being received and retained between the sides of cradle 30. The included angle of the sectors of the annular core that are encompassed may range from about 15° to 120° or so. Actuator 29 and cradle 30 comprise means for receiving and retaining diametrically opposite sectors of the annular body or core 27. The core is held against rotation on a diametrical axis by the nesting of the keyed boss in complementary shaped recess 62. While actuator 29, cradle 30 and adjusting screw 61 for core 27 are illustrated herein for purposes of disclosure, it is contemplated that other means for retaining or receiving the core and for calibrating it having different shapes and formed of different materials may be utilized within the scope of the invention so as to meet at least some of the objects thereof.

Two printed circuit boards PC1 and PC2 containing electrical circuitry including signal processing and logic components (which preferably includes a dedicated integrated circuit) are positioned parallel and spaced apart within lower housing portion 9 and adjacent chamber 25, as best seen in FIG. 2. The signal processing and logic circuits are programmed to be responsive to a plurality of preselected values of the electrical signal produced by the transducer and the electrical circuitry. A semiconductor power output device, comprising a MOSFET or other solid state switching device MS, and a voltage regulator VR are positioned on opposite sides of chamber 25 within base 12. The MOSFET is secured to a heat sink HS comprising a L-shaped metal bracket 69 in heat transfer relationship with metallic stop washer 33 via a layer of thermally conductive, electrically insulating tape 70. Terminal pins 71 for VR and MS project through board PC1 for connection to electrical circuit components mounted thereon. Several pins 72 project from the underside of the lower board PC2 for reception in conductive eyelets 73 which secure flat blade terminals 75 to lower housing portion 9 to form the terminal contacts of socket 11. One of the eyelets 72 is connected by a conductor 77 to the metallic collar 13 thereby to provide for grounding the collar through one terminal contact 75.

Figure 10:
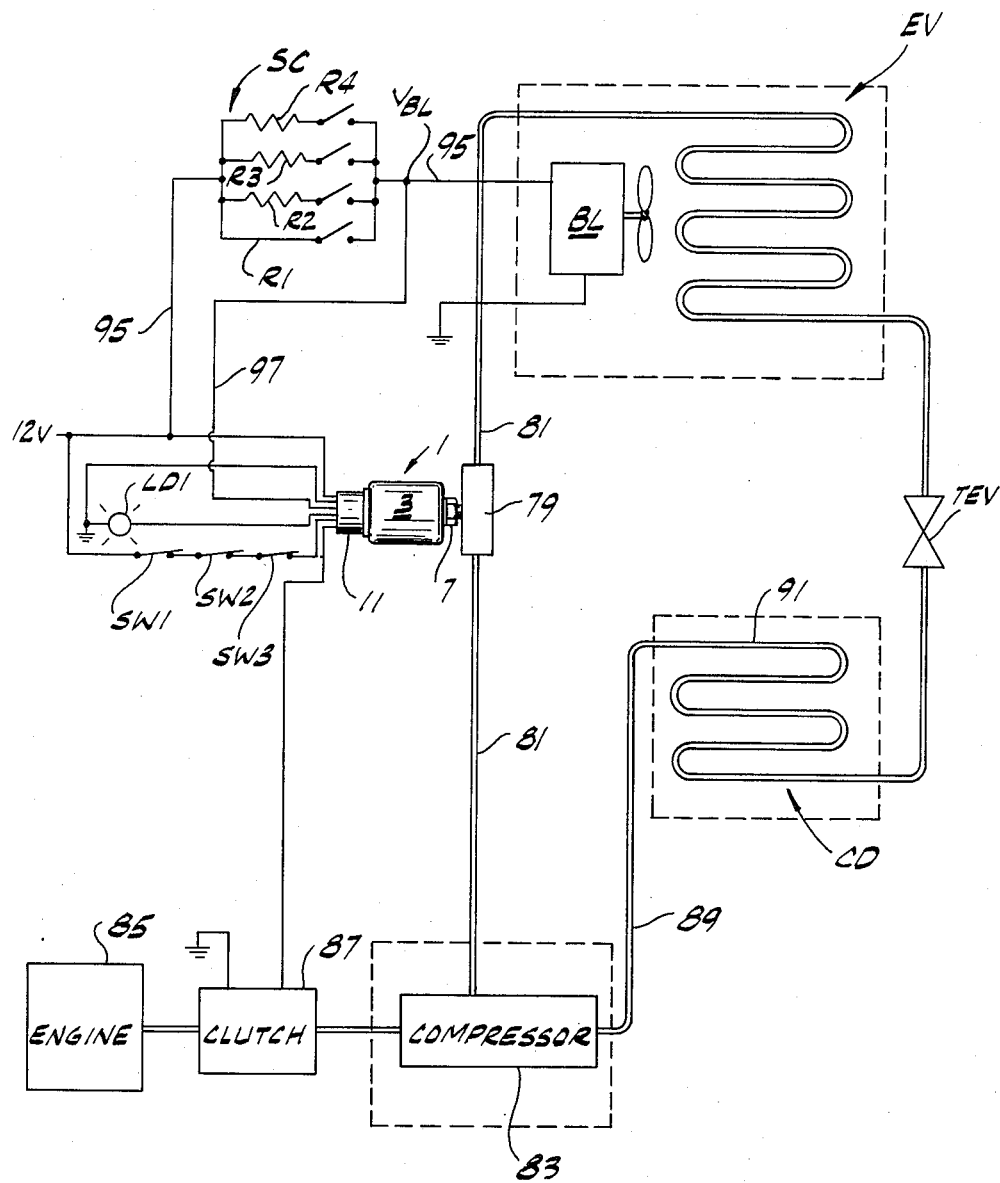
FIG. 10 is a schematic diagram illustrating an air conditioning system in one form of this invention incorporating therein the pressure sensor of FIGS. 1-9.

An air conditioning system, such as installed in an automobile, is shown in FIG. 10 with a smart pressure switch constituted by pressure sensor and control device 1 threaded onto the nipple of a metal fitting 79 connected in the low pressure or suction line 81 between an air conditioner compressor 83 and an evaporator EV. Compressor 83 is driven by an automotive engine 85 selectively coupled thereto by a conventional electromagnetic clutch 87, which comprises electrically energizable means to drive the compressor, to supply pressurized refrigerant such as "Freon" to a high pressure line 89. A condenser CD cools the pressurized refrigerant as it is moved to a capillary or to a thermal expansion valve TEV. The sudden drop in pressure and the resulting expansion of the refrigerant in evaporator EV removes heat from the air moved over and through the coils of the evaporator and thereby effects sensible cooling thereof. The air conditioning system is thus one example of a heat transfer system having a working fluid exhibiting a pressure.

A blower BL is supplied with electrical power from the vehicular battery via a conductor 95 and a blower speed control SC having four different series resistances R1-R4 which may be selectively switched into the circuit. Blower BL is operable at different blower speed selections for moving air over the evaporator thereby to cool the air. The voltage ($V_{BL}$) applied to blower BL, which is determinative of the blower speed, is also applied to one of the terminals of pressure sensor 1 by a line 97. By controlling the operation of the compressor in response to preselected pressure levels in the air conditioner evaporator and by establishing different predetermined evaporator pressure levels corresponding to respective blower speeds, as represented by different blower voltages $V_{BL}$, more desirable ratios of compressor run-to-off periods may be obtained with an attendant improvement in operational efficiency.

A plurality of optional normally closed interlock switches S1-S3 are serially connected between the positive terminal of the vehicular battery and another of the terminals 75 of the socket 11 of device 1. Switch S1 opens in response to excessive loading of the power steering pump (such as caused by cramping the steering wheel to either of its two limits). S2 opens in response to the throttle being moved to a sharply increased accelerator position; and S3 opens upon the refrigerant pressure exceeding a given maximum level. While switches S1-S3, operable in response to the conditions discussed above, are illustrated herein for purposes of disclosure, it is contemplated that a greater or a lesser number of such switches may be employed and may be operable in response to conditions other than those discussed above within the scope of the invention so as to meet at least some of the objects thereof. For example, a thermostatic switch responsive to the temperature of the return air to the air conditioner blower fan may be connected in series in this circuit in place of one of switches S1-S3, or in addition to S1-S3.

Upon connection of pressure sensor and control device 1 to a source of fluid pressure, e.g., the nipple of fitting 79, expansible chamber 19 of the control device becomes pressurized and causes diaphragm 16 to deflect thereby to apply or transmit to boss 39 a force proportional to the magnitude of the fluid pressure. This actuating force is transferred via actuator 29, which moves conjointly with diaphragm 16, to be applied radially, or in a generally diametrical direction, to the annular core 27 of magnetoelastic material which is constrained between actuator 29 and cradle 30 and is compressed therebetween and mechanically stressed as a function of the applied force which tends to deform or flatten the core. Because of magnetoelastic characteristics of annulus or core 27 its magnetic properties will vary as a function of the stress applied to the core.

The transducer comprising core 27, supported between actuator 29 and cradle 30, and coil 51, which comprise means responsive to stress-induced changes in the core's magnetic properties, produces an electrical signal having a value which is a function of the magnitude of the fluid pressure. This electrical signal may be developed by a pair of separate coils with a constant current excitation source, such as A.C., applied to the first coil and the sensor response being measured by the amplitude of the output voltage developed across the second coil which functions as a secondary winding of a transformer comprising annular core 27 and the two windings. As the stress to which core 27 is subjected changes the magnetic flux density saturation level of the core, the value of the electrical signal produced is a function of the magnitude of the fluid pressure. Also, a single coil may be excited from a low impedance constant voltage source of periodically changing voltage waveform and the coil current monitored as a measure of the stress-induced change in the magnetic flux density saturation level of the magnetoelastic annular core. A preferred arrangement for developing an electrical signal which is a function of the fluid pressure sensed by the transducer is described in the above-mentioned co-pending application Ser. No. 546,228, and as described hereinafter using a single coil transducer wherein as the level of current applied to the drive coil increases to the level of incipient core flux density saturation the polarity of drive current is then reversed by switching. As the magnetic flux density saturation level is decreased by increased stress on the core, the time period between successive switchings is reduced. Thus the electrical signal's frequency of switching or repetition rate is a function of the fluid pressure sensed by the transducer.

The electrical signals produced by the transducer are then processed by electrical circuitry, such as printed and mounted on circuit boards PC1 and PC2, appropriate to the nature of the signal produced (i.e., whether the value of the signal which is a function of the fluid pressure is, for example, amplitude or frequency) to provide an output to control the conductivity of power output device MS. By programming the circuitry to respond to different predetermined refrigerant pressures sensed, the power output device may be made to switch on or energize compressor clutch 87 when a first predetermined fluid pressure is sensed and to switch off or deenergize clutch 87 at a second but lower refrigerant pressure in suction line 81.

By having the opposing portions of the saddle-shaped pressure actuator 29 and cradle 30 encompass or receive a substantial sector of diametrically opposed sections of core 27, rather than having the force applied at sharply defined diametrically opposite points or edges, the core is firmly and reliably retained captive therebetween and is able to withstand the vibration and impact shocks to which a vehicle mounted component is subjected. The shaping of the cradle to serve not only to receive and retain the lower sector of core 27 but also to function as a coil bobbin provides a more stable and compact transducer assembly. It is preferred that the annular core be prestressed by adjusting the calibration screw 61 so that at a predetermined fluid pressure in the expansible chamber 19 the core is compressed somewhat.

As the electrical apparatus, such as electromagnetic clutch 87, which can be directly controlled or switched by the smart pressure switch, constitutes a substantial electrical load, e.g., several amperes, semiconductor switching device MS may generate substantial amounts of heat during its conductive periods. Dissipation of this heat is provided for by the heat conductivity path from MS via bracket 69 and heat sink HS to the metallic stop washer 33 which is in facial contact with metallic support washer 17. This assembly of washers and the heat sink for MS transfer heat through the thin resilient diaphragm 16 to the cold refrigerant moving through the suction line and which is present in expansible chamber 19. Stop washer 33 not only functions to act in cooling the power switching device MS but its radially projecting ledge 37 serves as an overpressure stop to positively limit inward travel of actuator 29 in the event of pressure in excess of a predetermined value in chamber 19.

Provision has also been made to substantially avoid temperature-induced dimensional changes in the transducer assembly and housing components adversely affecting the calibration and accuracy of pressure sensing and control device 1. This is accomplished by forming those components thereof, which in response to temperature-induced dimensional changes would increase the pressure on the core, of materials and dimensions which effect an additive thermal expansion which is substantially equal to that of those components which, in response to a temperature-induced dimensional change, would decrease the pressure on core 27. As an example, thermal expansion of the actuator 29, core 27, cradle 30, and calibration screw 61 would tend to increase the force applied to core 27 at any given fluid pressure, whereas thermal expansion of support washer 17, stop washer 33, and housing base portion 12 has the opposite effect. Thus, as an example, the following is a thermal expansion analysis of the listed components:

| Part | 10-6 inches/°F. |
| --- | --- |
| Actuator 29 | 3.0140 |
| Core 23 | 1.4421 |
| Cradle 30 | 1.6720 |
| Screw 61 | 1.8011 |

-continued

| Part | 10-6 inches/°F. |
| --- | --- |
|  | 7.9292 |
| Support washer 17 | .5146 |
| Stop washer 33 | .8300 |
| Base portion 12 | 6.5565 |
|  | 7.9011 |

Thus the net difference would be $0.0281 \times 10^{-6}$ inches/°F. ($0.01 \times 10^{-6}$ mm./°F.) so that the pressure sensor and control device would be substantially unaffected by temperature changes. It is contemplated that the above listed temperature induced dimensional changes may vary depending upon the material from which the corresponding part is made as well as the manner in which the corresponding part is formed, and it is also contemplated that various other materials having different temperature induced dimensional changes may be utilized in the formation of such corresponding parts within the scope of the invention so as to meet at least some of the objects thereof.

Figure 11:
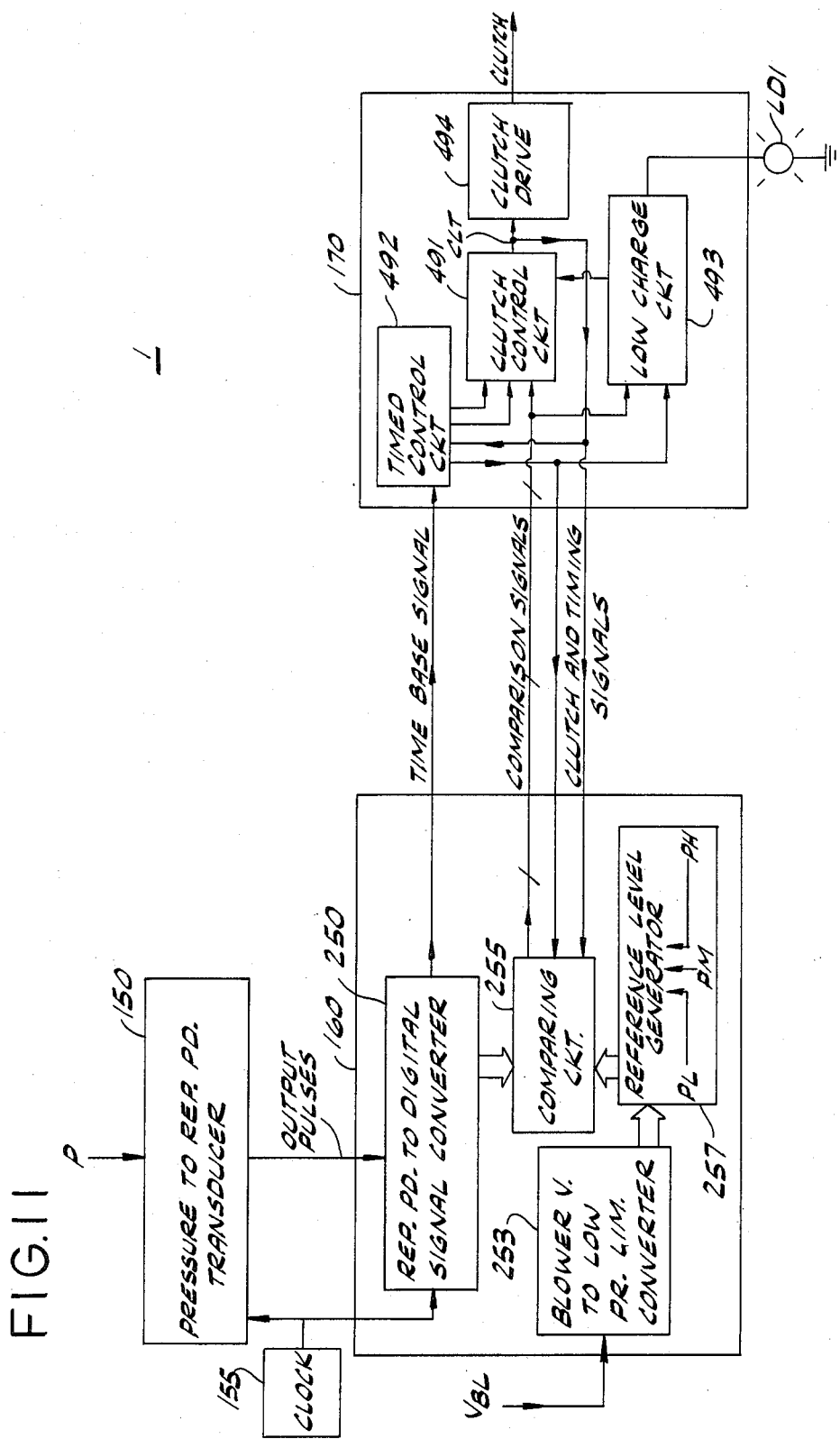
FIG. 11 is a block diagram of electrical circuitry for developing electrical signals having values which are a function of the pressures sensed by the device of FIGS. 1-3 and utilizing them to control the operation of an electrically actuated clutch for an automotive air conditioning system as shown in FIG. 10 and to signal if the refrigerant charge falls below a minimum level.
Figures 12, 13A:
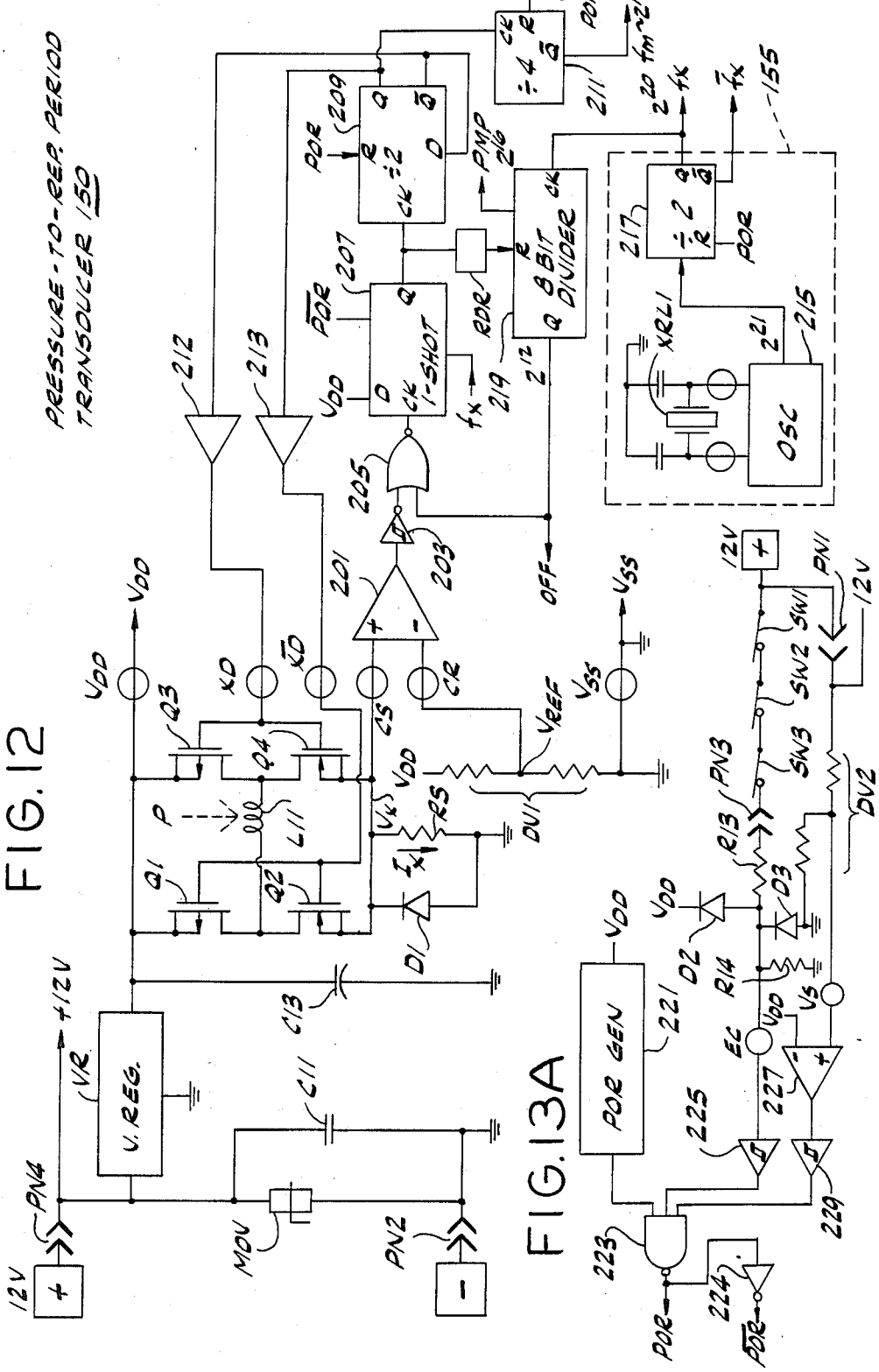
FIG. 12 is an electrical schematic and logic circuit diagram of electrical circuitry for generating a series of pulses having a repetition period which is a function of the pressure.
FIG. 13A is a schematic diagram of a power-on-reset (POR) circuit.
Figure 14:
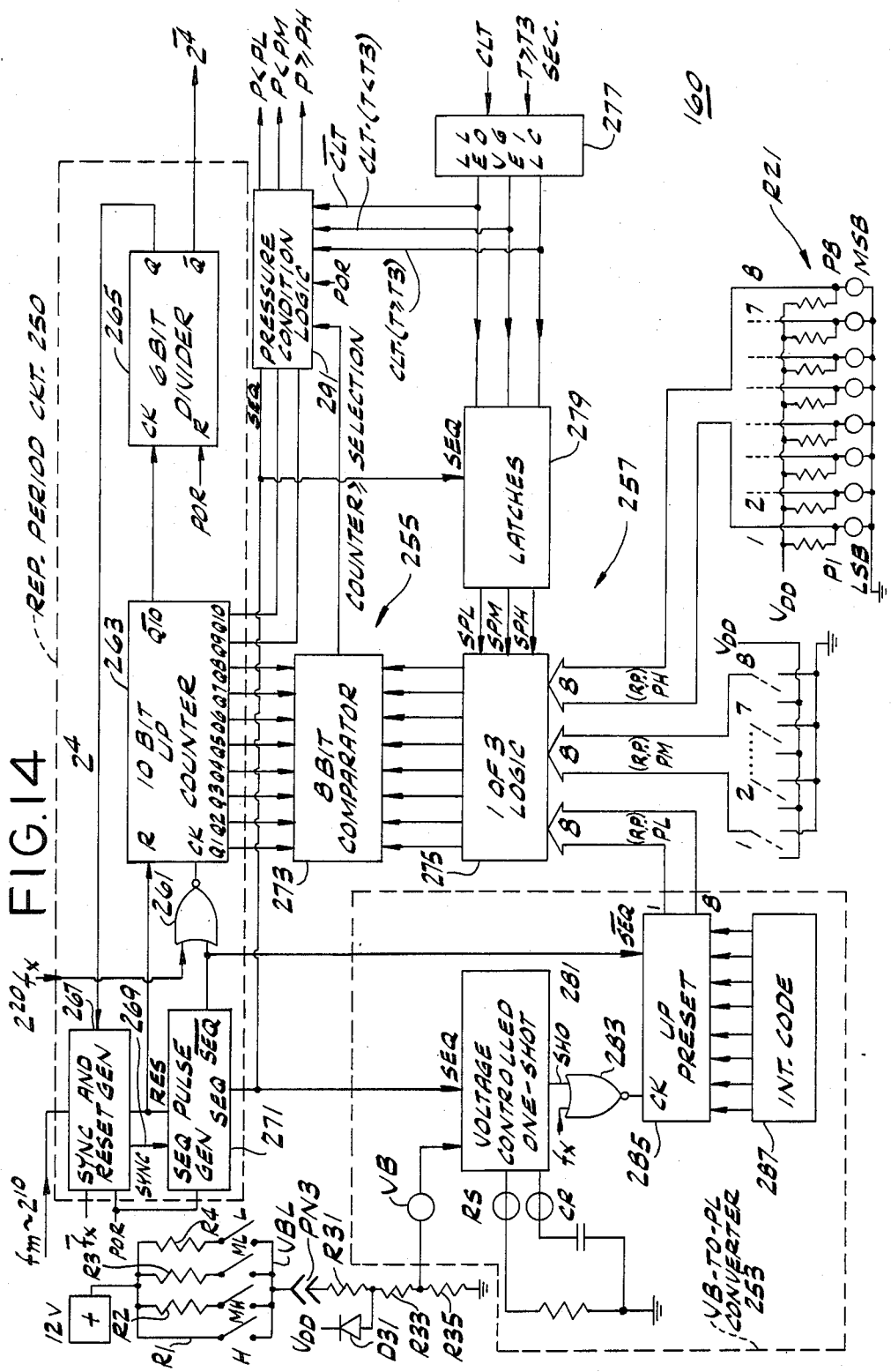
FIG. 14 is a block diagram of electrical circuitry for generating a parallel digital signal representative of repetition period of the pulses of FIG. 12B and comparing it with digital signals representing a high pressure limit, a low pressure limit and a low charge pressure limit.
Figure 21:
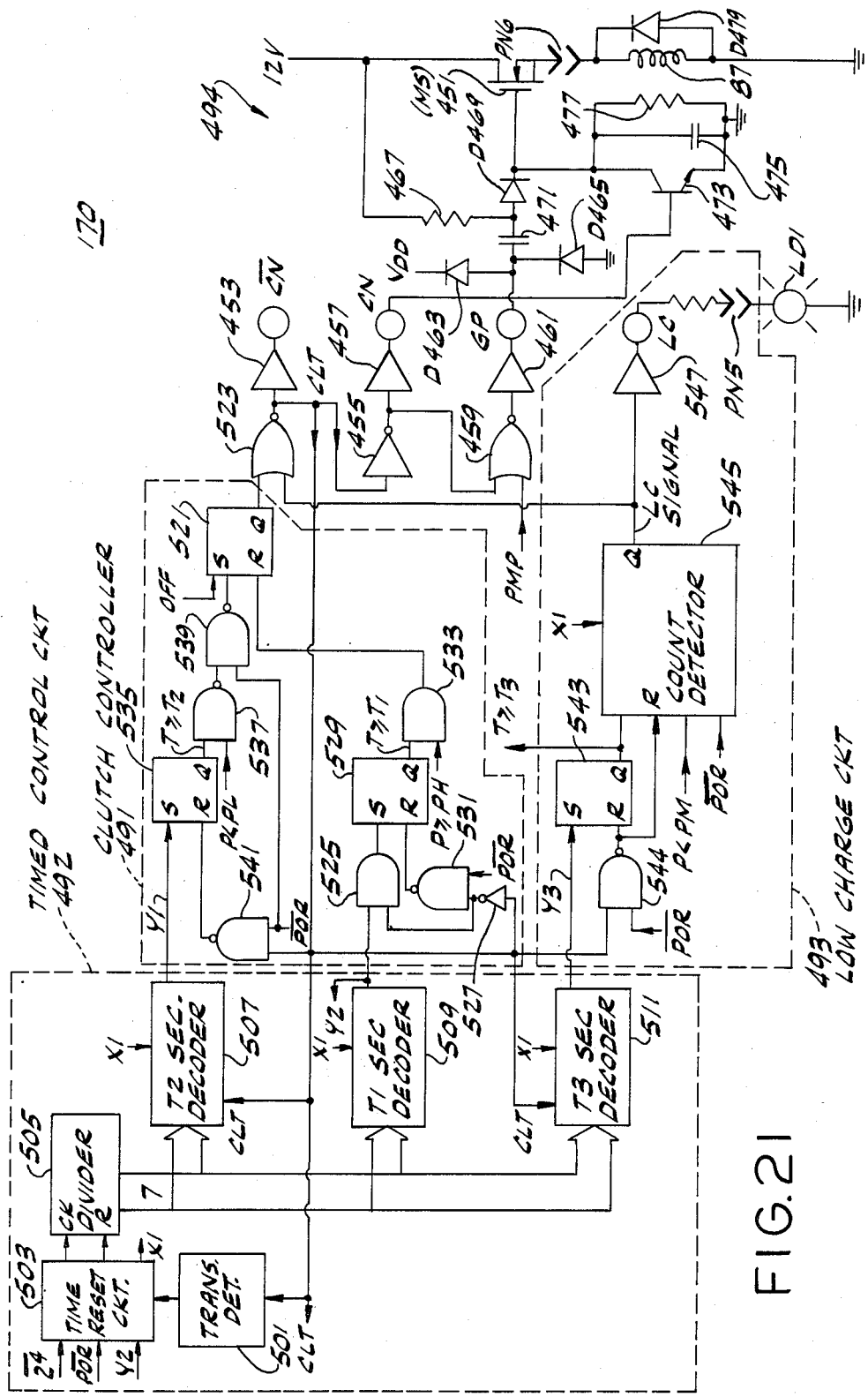
FIG. 21 is a block diagram of circuitry for providing a clutch control signal for use in the circuitry of FIG. 14 and for engaging and disengaging a clutch in the air conditioning system of FIG. 10.

FIG. 11 shows a block diagram of smart pressure switch circuit 1 suggesting some of the functions and overall organization of the electronic circuitry of FIGS. 12, 14 and 21.

Refrigerant pressure P in the suction line 81 of FIG. 10 is sensed by circuitry 150 which acts as a pressure-to-repetition-period generating circuit, or transducer, by providing a series of output pulses. Clock circuit 155 provides high frequency clock pulses for the system.

Circuitry 160 receives the output pulses from transducer 150 and clutch and timing signals from circuitry 170, and in response it provides comparison signals and a low frequency time base signal to circuitry 170. Circuitry 160 includes circuit 250 for producing a parallel digital signal for comparing circuit 255 representing the repetition period of the output pulses from transducer 150. A pressure limit reference level generator circuit 257 also provides parallel digital bits to comparing circuit 255 representative of a high pressure level or limit PH, a low charge level or limit PM, and a selected low pressure level or limit PL. The digital bits corresponding to low pressure limit PL are generated by converter circuit 253 in response to the blower voltage $V_{BL}$ selected by the user.

Circuitry 170 responds to the comparison signals from circuitry 160 which are fed to clutch control circuit 491 to produce a control signal CLT. Clutch drive circuit 494 is fed by control signal CLT and engages and disengages clutch 87 of FIG. 10. Timed control circuit 492 operating on the time base signal from circuit 250 responds to each change in control signal CLT for activating the functions of clutch control circuit 491 and low charge circuit 493 at or after predetermined time intervals. If a low charge condition occurs, low charge circuit 493 turns on light LD1 and overrides clutch control circuit 491 so as to deenergize and disengage the clutch.

The pressure to repetition period transducer 150 and the repetition period to digital signal converter 250 together constitute means responsive to stress-induced changes in the magnetic properties of core, or body, 27 for producing an electrical digital signal responsive to the pressure of the refrigerant, or fluid pressure, in the suction line 81. Pressure to repetition period transducer 150 also constitutes a transducer for generating a series of electrical pulses having a repetition period which is a function of a physical variable, which is pressure P of the refrigerant for example in this embodiment. In another aspect the transducer 150 constitutes means for producing oscillations having a repetition period functionally related to changes in a physical property, e.g. magnetoelastic property, of the core, or body, 27. In the present embodiment the oscillations having a repetition period functionally related to the fluid pressure of the refrigerant as well, because the core 27 is stressed by the fluid pressure P. Repetition period to digital signal converter 250 also constitutes means responsive to the series of pulses to generate a first digital signal, which is representative of the repetition period, the first digital signal comprising the pressure responsive electrical signal.

Comparing circuit 255 constitutes means for comparing the electrical signal representing the refrigerant pressure in the suction line 81 to a higher pressure electrical reference signal and to a selected one low pressure electrical reference signal. As such comparing circuit 255 also constitutes means for comparing a first digital signal being the electrical signal representing the refrigerant pressure produced in converter 250 and a second digital signal being any one of the electrical reference signals to produce a least one comparison, or control, signal for the rest of the system. During the operations of the circuitry of FIG. 11 comparing circuit 255 is able to compare the electrical digital signal responsive to the fluid pressure with each electrical digital reference signal.

Reference level generator 257 together with its associated blower voltage to low pressure limit converter 253 constitute means for generating or providing a selected one of a plurality of electrical digital reference signals corresponding to a selected low pressure level or limit PL in response to a respective one of the blower speed selections, and for generating or providing another electrical digital reference signal corresponding to a higher pressure level or limit PH. The blower voltage to low pressure limit converter 253 constitutes means responsive to the selection of any one of a plurality of voltage levels $V_{BL}$ indicative of the blower speed selections for generating a second digital signal for comparison with the pressure responsive first digital signal from repetition period to digital signal converter 250, the second digital signal comprising the selected one low pressure electrical reference signal. Reference level generator 257 constitutes means for supplying to the comparing circuit 255 the second digital signal when a compressor driving means (clutch 87) is energized and for supplying to the comparing circuit 255 a third digital signal, the third digital signal comprising the electrical reference signal corresponding to the higher pressure level PH when the compressor driving means is deenergized.

In circuitry 170, the clutch control circuit 491, timed control circuit 492 and clutch drive circuit 494 together constitute a switching circuit responsive to a control signal, such as the comparison signals from comparing circuit 255, indicating that a physical variable (e.g. pressure) has reached a specified level. The switching circuit actuates the air conditioning heat transfer system of FIG. 10 when the refrigerant fluid pressure P reaches a high pressure limit and deactuates the system when the pressure P reaches the selected low pressure limit. Thus, the switching circuit is also able to control the physical variable pressure P in response to the comparison signals. More particularly, clutch control circuit 491, timed control circuit 492 and clutch drive circuit 494 together constitute means responsive to the comparing circuit 255 to generate a clutch energizing signal CLT for electrically energizing the compressor driving means when the refrigerant pressure P exceeds the higher pressure level PH and to terminate the clutch energizing signal CLT for electrically deenergizing the compressor driving means when the refrigerant pressure P falls below the selected low pressure level PL. In operation, this circuitry for electrically energizing the compressor driving means is responsive to a high pressure comparison signal from comparing circuit 255 to electrically energize the compressor driving means (clutch 87) only after a first predetermined time period T1 following deenergization of the compressor driving means and is responsive to a low pressure comparison signal from the comparing circuit 255 for electrically deenergizing the compressor driving means only after a second predetermined time period T2 following energization of the compressor driving means.

FIG. 11 also relates to electronic circuitry to supply a signal to light emitting diode LD1 indicative of a low refrigerant charge condition if and when it occurs. The circuitry includes repetition period to digital signal converter 250, comparing circuit 255, reference level generator 257, timed control circuit 492, and low charge circuit 493. The circuitry is responsive to rate of change in the electrical signal comprising the electrical output pulses from transducer 150. For example, in the preferred embodiment the circuitry is responsive to rate of change of repetition period, and hence frequency of the electrical output pulses from transducer 150. Reference level generator 257 supplies an additional digital signal corresponding to a low charge pressure level PM, for use in the low charge operations. The comparing circuit 255 compares the electrical signal from converter 250 representing the refrigerant pressure in the suction line 81 to the low charge electrical reference signal which is the just-mentioned additional digital signal. Together the converter 250, comparing circuit 255 and reference level generator 257 constitute means for processing the electrical signal responsive to the refrigerant pressure P by comparing the electrical signal with the low charge pressure limit PM. The timed control circuit 492 and low charge circuit 493 together constitute means for producing the signal indicative of the low charge condition in response to the processing means when the refrigerant pressure P has at least once reached the low charge pressure limit PM within a predetermined or preestablished time period T3 of operation of the compressor. More particularly, low charge circuit 493 is responsive to the refrigerant pressure P falling from the higher pressure level PH to the low charge pressure level PM within the preestablished time period T3 during each of a plurality of successive periods of energization of the compressor driving means (clutch 87) to indicate the existence of a low refrigerant charge.

Some drawing conventions utilized for clarity and brevity without sacrificing completeness of disclosure in drawing figures discussed hereinafter are as follows. Squares around "+" and "−" signify the automotive 12 volt source connections outside the pressure switch 1. Circles around lead lines indicate integrated circuit pins in an integrated circuit embodiment of the circuits diagramed in the figures. Large arrows in mateable proximity indicate exterior pins PN1, PN2, PN3, PN4, PN5, and PN6 of the smart pressure switch unit 3.

The block diagram notation used in the drawings assumes that each frequency divider or counter has a series of D flipflops and that a single reset R input on a multibit counter or frequency divider signifies connection to the reset input of every D flipflop. In counters and dividers each Q-bar output of each D flipflop is provided to the clock input of the next D flipflop, and the Q-bar output of each D flip-flop is also connected back to its own data (D) input. Each upcounter is assumed to have all Q outputs available. A frequency divider is an upcounter with one or a few of the Q outputs being used.

NAND-NOR-inverter logic is assumed. Where AND and OR gates are shown, it is presumed that the skilled worker will provide the appropriate inverter after a NAND or a NOR gate to accomplish the appropriate function.

Referring now to FIG. 12, 12 volt automotive supply voltage is provided to metal oxide varistor MOV and capacitor C11 for transient suppression, and to voltage regulator VR to provide a d.c. supply voltage $V_{DD}$ which is nominally 8 volts across capacitor C13. Pressure P is exerted against magnetoelastic core 27 (see FIG. 1), around which is provided the coil 51 to form an inductor L11 of FIG. 12. Inductor L11 is connected to a switching circuit consisting of p-channel FETs Q1 and Q3 and n-channel FETS Q2 and Q4. A current is reversibly switched through inductor L11 by switching on FETs Q1 and Q4 alternating with switching on FETs Q2 and Q3. The gates of FETs Q1 and Q2 are connected to pin XD-bar, and the gates of FETs Q3 and Q4 are connected to pin XD.

Diode D1 shunts a negative part of the current in L11 away from shunt resistor $R_S$. The positive current part $I_x$ creates a voltage $V_x$ across shunt resistor $R_S$. Voltage $V_x$ is provided to input pin CS for the non-inverting input of a comparator 201. The inverting input of comparator 201 is connected at pin CR to a preset reference voltage $V_{REF}$ set by voltage divider DV1 so that comparator 201 switches at a point on current $I_x$ that just saturates the magnetoelastic core 27.

Figure 12A:
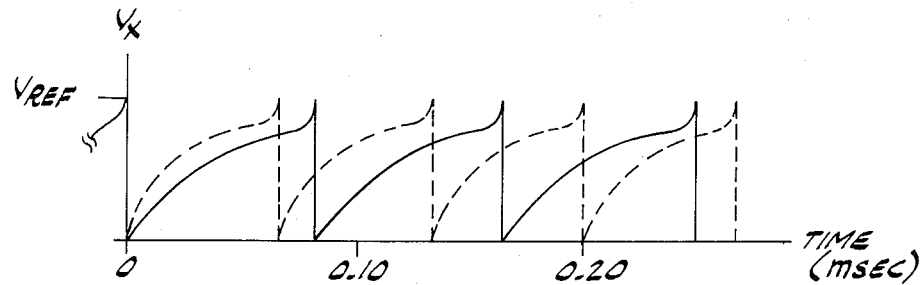
FIG. 12A is a graph of sawtooth oscillations in the circuit of FIG. 12 using a magnetoelastic pressure sensor.

FIG. 12A shows the cycles of voltage $V_X$ across the shunt resistor $R_S$ and indicates $V_{REF}$ as the reference voltage which is reached by each cycle when comparator 201 signals for a new cycle to begin. The output of comparator 201 is provided through Schmitt input inverter 203 to NOR gate 205 and then to the clock input of a one shot circuit 207. In response to voltage $V_X$ reaching the saturation point $V_{REF}$, the one-shot 207 provides a pulse output Q which clocks a flipflop 209 configured as a divide-by-two frequency divider. The Q and Q-bar outputs of flipflop 209 respectively feed driver circuits 213 and 212 which drive FETs Q1, Q2, Q3, Q4 so as to reverse the current through inductor L11 and thereby begin a subsequent cycle in FIG. 12A.

Varying the pressure P on the magnetoelastic core 27 causes the saturation point $V_{REF}$ to be reached in a shorter or longer period of time thereby changing the repetition period of the sawtooth wave form in FIG. 12A.

Figure 12B:
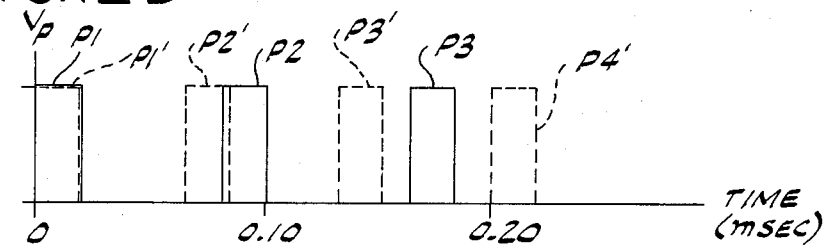
FIG. 12B is a graph of electrical pulses versus time produced by the circuit of FIG. 12 showing a change in repetition rate corresponding to change in refrigerant pressure.

FIG. 12B shows the pulse output Q from the one-shot 207. Each of the pulses P1, P2, and P3 is provided by one-shot 207 in response to a first magnitude of pressure P. Each of the pulses begins at the trailing edge of each sawtooth of FIG. 12A. For a higher pressure P the pulses P1', P2', P3' and P4' have a higher repetition rate (frequency) and a lower repetition period in response to the trailing edges of the dashed sawtooth cycles of FIG. 12A. Conversely, for a lower pressure P the pulses would have a lower repetition rate and a greater repetition period. It is noted that by definition the repetition period is the duration of each cycle of a periodic waveform. Also by definition the repetition period in seconds is the reciprocal of the repetition rate expressed in Hertz. In the present embodiment, the repetition rate of the pulses of FIG. 12B is an increasing function of the pressure P, and consequently the repetition period of the pulses is a decreasing function of pressure P.

The pulse output Q of divide-by-two frequency divider 209 of FIG. 12 is fed to a divide-by-four frequency divider 211 which in turn provides a Q-bar output $f_m$. Output $f_m$ is the output pulses from transducer 150 of FIG. 11 and has a 50% duty cycle and has eight times the repetition period, and one eighth the frequency of the pulses of FIG. 12B. The circuit of FIG. 12 as a whole acts as the pressure-to-repetition period generator or transducer 150. Frequency dividers 209 and 211 advantageously provide a degree of repetition period averaging as they produce the output $f_m$, because random variations in the length of individual cycles in FIG. 12A are effectively added together over eight cycles to produce one cycle of output $f_m$. Accordingly, the random variations tend to cancel each other in output $f_m$. Nominal repetition rates of the one-shot 207 output shown in FIG. 12B are approximately 11 to 14 kiloHertz for a pressure variation from about 20-50 psig in this preferred embodiment. The output $f_m$ is ⅛ as much, or roughly 2 Hertz.

Associated with the transducer circuit of FIG. 12 is a clock oscillator 215 having crystal XRL1, which provides an output at $2<$Hertz or about 2 megaHertz. Divide-by-two circuit 217 then provides 2˙Hertz clock pulses $f_x$ and their complement $f_x$-bar. Thus, the circuitry 155 indicated by dashes constitutes means for generating a series of clock pulses higher in frequency than the transducer pulses $f_m$. The clock pulses $f_x$ are provided to the clock input of 8 bit divider 219 from divide-by-two circuit 217. The 8 bit divider 219 divides down the clock pulses $f_x$ to 2 Hertz and feeds NOR gate 205. If the transducer 150 should temporarily stop oscillating, the $2^{12}$ pulses will restart it through NOR gate 205, thereby increasing reliability. In addition the $2^{12}$ pulses are provided as signal OFF to the circuitry of FIG. 21 to disengage the clutch 87 if transducer 150 stops oscillating. One-shot 207 resets 8 bit divider 219 through reset drive circuit RDR. When the transducer 150 is oscillating, the resetting of divider 219 effectively terminates its production of the output signals at $2^{12}$ Hertz. Pump pulses PMP at $2^{16}$ Hertz for use at clutch drive circuit 494 of FIG. 21 are being contemporaneously derived 4 bits into divider 219. However, the resetting by reset drive circuit RDR does not significantly affect them because of their high $2^{16}$ frequency.

FIG. 13A shows a circuit section for initializing the operations of the smart pressure switch 1 and shutting off the operation of the air conditioner when necessry. Block 221 is a power-on-reset (POR) generator, also known as a power-on-clear (POC) circuit. The POR generator supplies a logic low output for any suitably selected brief time interval, as in the range 10 microseconds to 1 millisecond, when d.c. supply voltage $V_{DD}$ is first activated and while $V_{DD}$ is still rising to its nominal value. When the rising $V_{DD}$ reaches a level predetermined by an internal reference device in the POR generator, the output logic level changes to a High state. This type of circuit is familiar to the skilled worker and is accordingly not described further. NAND gate 223 then provides an initial High output POR and by inverter 224, its complement POR-bar in response to POR generator 221.

An air conditioning interrupt signal is providable at external control terminal EC from normally closed cutout switches SW1 (high pressure), SW2 (throttle acceleration) and SW3 (power steering). Resistors R13 and R14 and diodes D2 and D3 to $V_{DD}$ and ground protect pin EC. When at least one cutout switch opens a logic Low is fed to Schmitt input buffer 225 for driving the NAND gate 223.

A Low Battery Voltage cutout circuit is provided at terminal VS by comparator 227 and Schmitt input buffer 229. The unregulated (nominally 12 v.) battery voltage at pin PN1 is fed to voltage divider DV2. Divider DV2 is chosen so that if battery voltage falls, say, below 10 volts, the voltage at the noninverting input of comparator 227 falls below regulated voltage $V_{DD}$. Comparator 227 then feeds a logic Low through buffer 229 and forces POR high through NAND gate 223. This resets all circuitry and disengages the air conditioner clutch in FIG. 21.

Figure 13B:
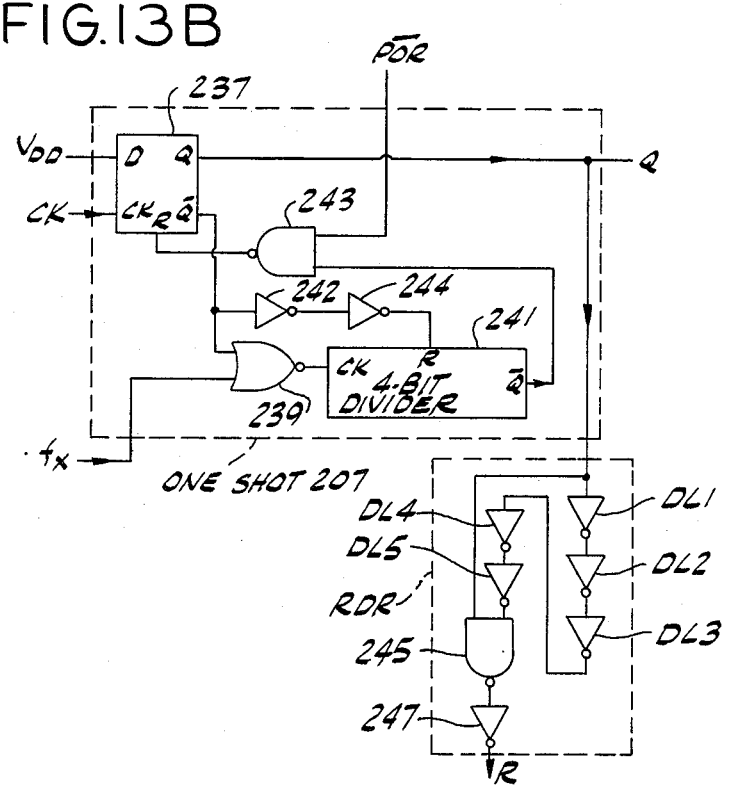
FIG. 13B is a logic circuit diagram providing greater detail of a one-shot circuit and of a reset drive circuit in the circuitry of FIG. 12.

In FIG. 13B the one shot 207 of FIG. 12 is shown in greater detail. The output of NOR gate 205 feeds the clock input CK of flipflop 237 clocking the Q output High because the D input of flipflop 237 is tied high to $V_{DD}$. Output Q-bar goes Low enabling NOR gate 239 to provide an output corresponding to one megaHertz clock pulses $f_x$ to the clock input of 4 bit divider circuit 241. When 4 bit divider circuit 241 has counted up, its output Q-bar goes Low, forcing the output of NAND gate 243 High, thereby resetting flipflop 237. This takes the Q output of flipflop 237 Low, completing the one-shot pulse output Q. The Q-bar output of flipflop 237 goes High, disabling NOR gate 239 and delayedly resetting 4 bit divider circuit 241 through inverters 242 and 244. Divider 241 Q-bar output is thus reset High, releasing reset R of flipflop 237 (unless POR-bar has gone Low from its normal High state). This returns the operation of the one-shot circuit 207 to its initial condition.

The Q output of the one-shot 207 provides the pulses of FIG. 12B to reset driver RDR. As illustrated in FIG. 13B, each pulse input High to reset driver RDR enables NAND gate 245, turning on the reset output R of inverter 247 for a period of time set by delay inverters DL1, DL2, DL3, DL4 and DL5. The delay time is long enough to reset the divider 219 of FIG. 12 and short enough to avoid disrupting the generation of pump pulses PMP. As soon as the high output of one-shot 207 propagates through the delay inverters, producing an input low to NAND gate 245, NAND gate 245 has its output forced high, which is inverted by inverter 247 to make reset output R go back low.

Referring to FIG. 12, the transducer circuitry 150, providing the output $f_m$ from frequency divider 211, constitutes means for producing an electrical signal responsive to pressure of the refrigerant in the suction line 81 of FIG. 10. This electrical signal producing means includes transducer means for generating a series of pulses having a repetition period responsive to the refrigerant pressure.

The block diagram of FIG. 14 includes repetition period circuit 250, a circuit for converting the signal $V_{BL}$ corresponding to a selected blower voltage to a selected low refrigerant pressure limit (designated the VB-to-PL converter 253), comparing circuit 255, and pressure reference level generating circuitry 257.

Figure 14A:
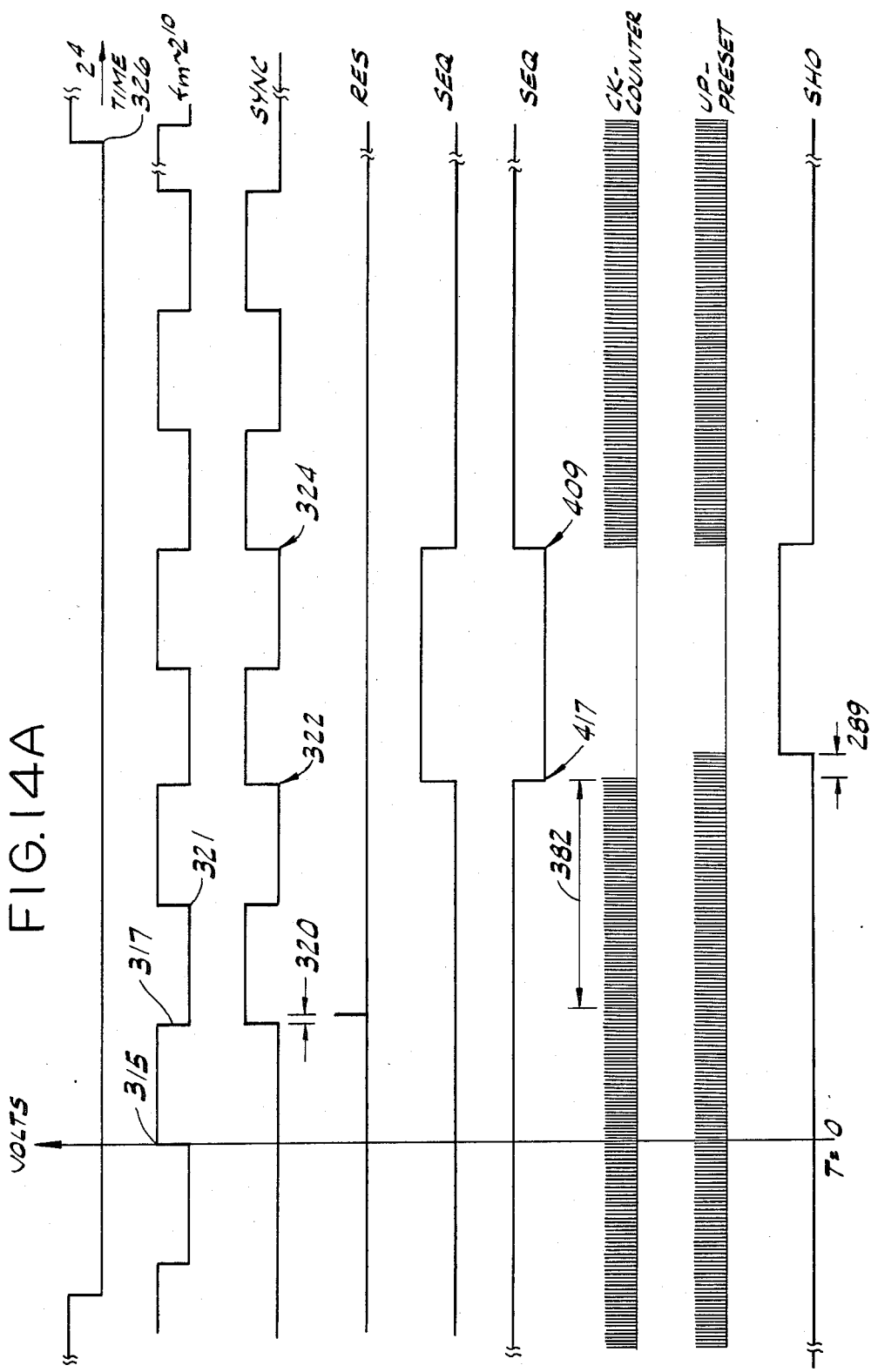
FIG. 14A is a graphical representation of waveforms occurring in the circuitry of FIG. 14.

In discussing repetition period circuit 250, reference is made to FIGS. 14 and 14A. The clock pulses $f_x$ at $2^{20}$ Hertz are supplied through NOR gate 261 to the clock input of up counter 263. The voltage at the clock input is the pulses CK-COUNTER in FIG. 14A. The Q10-bar output of up counter 263 drives the clock input of a 6 bit divider 265. The Q output of the 6 bit divider 265 provides a series of pulses at nominally $2^4$ Hertz or 16 Hertz. These $2^4$ pulses are provided together with the transducer pulses $f_m$ and the complement $f_x$-bar of the clock pulses $f_x$ to synchronizing and reset generator 267. Pulses SYNC, which are related to the transducer pulses $f_m$, are provided synchronized with the clock pulses $f_x$ on line 269. Reset pulses RES are also provided as output to reset the 10 bit up counter 263 and to drive the sequence pulse generator 271. The repetition period circuit 250 periodically samples, in effect, the repetition period of the output pulses $f_m$ of the transducer circuitry 150 by means of timing pulses which include the reset pulses RES and the sequence pulses SEQ and their complement SEQ-bar. These pulses RES and SEQ repeat at a $2^4$ Hertz rate to control the operations of the circuitry.

Most of the time, clock pulses $f_x$ are provided to the clock input of 10 bit up counter 263 as shown on the graph CK-COUNTER of FIG. 14A. After a falling transition in the $2^4$ pulse the 10 bit upcounter 263 is reset by pulse RES. Up counter 263 then during time interval 382 counts up from zero the pulses $f_x$ until pulse SEQ-bar goes high, forcing up counter 263 clock input CK Low. At this time up counter 263 holds a count of the clock pulses indicative of the repetition period corresponding to refrigerant pressure as a set of bits Q1, Q2, Q3, Q4, Q5, Q6, Q7, Q8, Q9 and Q10. The first eight of these bits are provided to 8 bit comparator 273.

Repetition period to digital signal converter circuit 250 constitutes means for counting the series of clock pulses $f_x$ in response to the transducer pulses $f_m$ to provide a first digital signal representative of the repetition period of the transducer pulses, for generating time, or timing, pulses $2^4$ having a repetition period greater, and frequency lower, than the transducer pulses, and for repeating the counting in response to at least some successive ones of the timing pulses. The clock pulses $f_x$ are in the process also frequency divided so as to provide a time base signal in the form of the timing pulses $2^4$ for the timed control circuit 492 of FIG. 21. In circuit 250 Sync and Reset generator 267 constitutes means for generating pulses SYNC and pulses RES in response to the timing pulses $2^4$ to reset the counting, whereby repeating of the counting occurs. Sequence generator 271 constitutes means for generating other pulses SEQ-bar in response to the reset pulses RES and the transducer pulses $f_m$ so that each such SEQ-bar other pulse respectively commences later than each reset pulse RES by a period of time 382 (FIG. 14A) indicative of the repetition period of the transducer pulses and temporarily prevents the counting and frequency-dividing circuits 263 and 265 from counting during each such SEQ-bar other pulse whereby the up counter 263, having been reset and counting during the period of time 382 indicative of the repetition period of the transducer pulses and then been temporarily prevented from counting, provides the first digital signal for the comparing means during each such SEQ-bar other pulse.

A second set of digital bits is provided by one-of-three logic 275 to the 8 bit comparator 273. The one-of-three logic 275 has three eight-bit buses respectively corresponding to second, third and fourth sets of bits for repetition period (R.P.) of a selected low pressure limit (PL), repetition period of a high pressure limit (PH), and repetition period of an additional low charge pressure limit PM. Pressure limit PH is coded by ground jumpers at some of eight exterior pins P1–P8 having eight pull up resistors designated collectively as R21. The low charge pressure limit PM bits are provided by an internal hardwired code wherein the eight bit lines on a bus for low charge pressure limit PM are tied either to $V_{DD}$ or to ground depending on the bits in the code for PM. The one-of-three logic 275 selects the bits for PL, PM, or PH depending on the input from level logic 277 through latches 279.

One-of-three logic 275, latches 279 and level logic 277 together constitute, among other things, means for alternately providing, or substituting, as a reference signal the digital signal representing high level or limit PH in place of the selected one electrical digital signal representing selected low level or limit PL at comparator 273, the substituting means being responsive to at least one signal CLT indicative of operational state of the system from the switching circuit in FIG. 21 thereby to alternately and sequentially provide the control signal in the form of comparison signals P-LT-PL and P-GT-PH in a manner adapted for control of the physical variable pressure P through the switching circuit relative to both the low level PL and the high limit PH.

VB-to-PL converter circuit 253 includes a voltage controlled one-shot 281, NOR gate 283, up preset counter 285, and a hardwired internal starting code 287. A voltage at resistor R35 corresponding to blower voltage $V_{BL}$ is provided to pin VB to the voltage controlled one-shot 281 by a voltage divider having resistors R31, R33 and R35. The voltage divider is also tapped at the top of resistor R33 so that any voltage $V_{BL}$ exceeding 12 volts is divided down and clamped to $V_{DD}$ by diode D31. In this way, variations in the nominal automotive battery voltage of 12 volts are prevented from adversely affecting converter 253 performance.

A series of clock pulses $f_x$ is normally being applied through NOR gate 283 to the clock input of preset 8 bit up counter 285. These pulses are illustrated at UP-PRESET in FIG. 14A. When the sequence pulse SEQ-bar goes high, the preset up counter 285 is released from the voltages of internal code 287 and briefly counts up from the code for a time interval 289 (FIG. 14A) until voltage controlled one-shot 281 provides a high output SHO to NOR gate 283 forcing it off. The time interval 289 is proportional to VB. Preset up counter 285 at this point holds a binary count value. The binary count value is arranged (as discussed below in connection with FIG. 26) to be the same as the first 8 bits (Q1–Q8) which would reside in up counter 263 corresponding to the repetition period of pulses $f_m$ when measured pressure P becomes equal to a selected low pressure level corresponding to the blower voltage $V_{BL}$. The binary count value resides in up counter 285 and is available as a parallel digital signal on the 8-bit-wide bus marked PL for the remainder of the duration of sequence pulse SEQ-bar. VB-to-PL converter 253 constitutes means for sensing any one of a plurality of voltage levels $V_{BL}$ respectively indicative of a selected one of a plurality of levels, or low pressure limits, of the physical variable pressure P and, in response to the timing pulses $2^4$, which cause pulses SEQ and SEQ-bar to occur, repeatedly generating a second digital signal representing the selected one level PL by providing a third digital signal (the preset digital binary internal code 287) representing the highest selectable level of the plurality of levels or limits of the physical variable pressure P and adding to the third digital signal, or augmenting it by, a binary amount related to the sensed voltage level thereby to generate the second digital signal. In other words, the preset binary code 287 is digitally augmented by an amount which is a function of a selected electrical analog level of $V_{BL}$ corresponding to the selected low pressure limit PL to provide on the bus marked "(R.P.) PL" the selected one of the plurality of electrical digital reference signals. Preset up counter 285 and voltage controlled one-shot 281 constitute means for digitally up-counting clock pulses $f_x$, starting the count from the third digital signal, for a period of time 289 (FIG. 14A) related to the sensed voltage level, whereby the adding is achieved and the selected one of the plurality of electrical digital reference signals corresponding to the selected low pressure limit is provided.

When latches 279 provide a high signal SPL calling for presentation of the bits corresponding to the pressure limit PL, then one-of-three logic 275 presents that set of digital bits to the 8 bit comparator 273 during the duration of pulse SEQ-bar. 8 bit comparator 273 settles and provides its output to circuit 291, designated pressure condition logic, where the rising transition 409 of sequence pulse SEQ latches the results of the comparison and produces comparison signals P-LT-PL, P-LT-PM and P-GT-PH. The designations P-LT-PL, P-LT-PM, and P-GT-PH respectively stand for "measured pressure P less than selected low pressure level PL," "measured pressure P less than low charge pressure level PM," and "measured pressure P greater than or equal to high pressure level PH," as indicated in mathematical symbols on FIG. 14. The comparison signals are provided on separate lines of a three line bus as indicated in FIG. 11 and FIG. 14.

Comparator 273 compares a first digital signal from up counter 263 representative of repetition period and related to pressure P with a second digital signal related to low pressure limit PL, with a third digital signal related to high pressure limit PH, and with a fourth digital signal related to low charge pressure limit PM. Pressure condition logic 291 constitutes means responsive to comparator 273 for providing a low pressure comparison signal P-LT-PL upon the refrigerant pressure P falling below the selected low pressure level PL when a clutch energizing signal CLT is being generated and for providing a high pressure comparison signal P-GT-PH when the refrigerant pressure P exceeds the higher pressure level PL after the clutch energizing signal CLT is terminated, the low pressure comparison signal P-LT-PL resulting from the digital comparison of the first and second digital signals, the high pressure comparison signal resulting from the digital comparison of the first and third digital signals. Because of the time T-GT-T3 signal which is ANDed with the clutch energizing signal CLT and made available to pressure condition logic 291, a low charge pressure comparison signal P-LT-PM is also provided when a comparison of the first and fourth digital signals indicates the refrigerant pressure P has fallen below the low charge pressure level PM before a third predetermined period of time T3 has elapsed following energization of the compressor driving means (clutch 87). In other words, the low charge pressure comparison signal P-LT-PM is generated only when the time signal or output T-GT-T3

(which occurs during an interval of clutch energization, the time signal T-GT-T3 being herein called a timekeeping output) from timed control circuit 492 coincides with a transducer pulse repetition period count from up counter 263 reaching a predetermined value corresponding to low charge pressure limit PM.

Then, at the end of sequence pulse SEQ-bar NOR gate 261 is again enabled the clock pulses $f_x$ resume clocking 10 bit upcounter 263. In this way output pulses Q10-bar continue to be produced by up counter 263 for driving 6 bit divider 265 which in turn has a Q-bar output $2^4$-bar which provides a convenient source of the time base signal for the timed control circuit 492 in FIG. 21. The need for additional frequency dividing circuitry is obviated thereby providing advantages of economy and simplicity when the 10 bit up counter 263 is used in this way.

Figure 15:
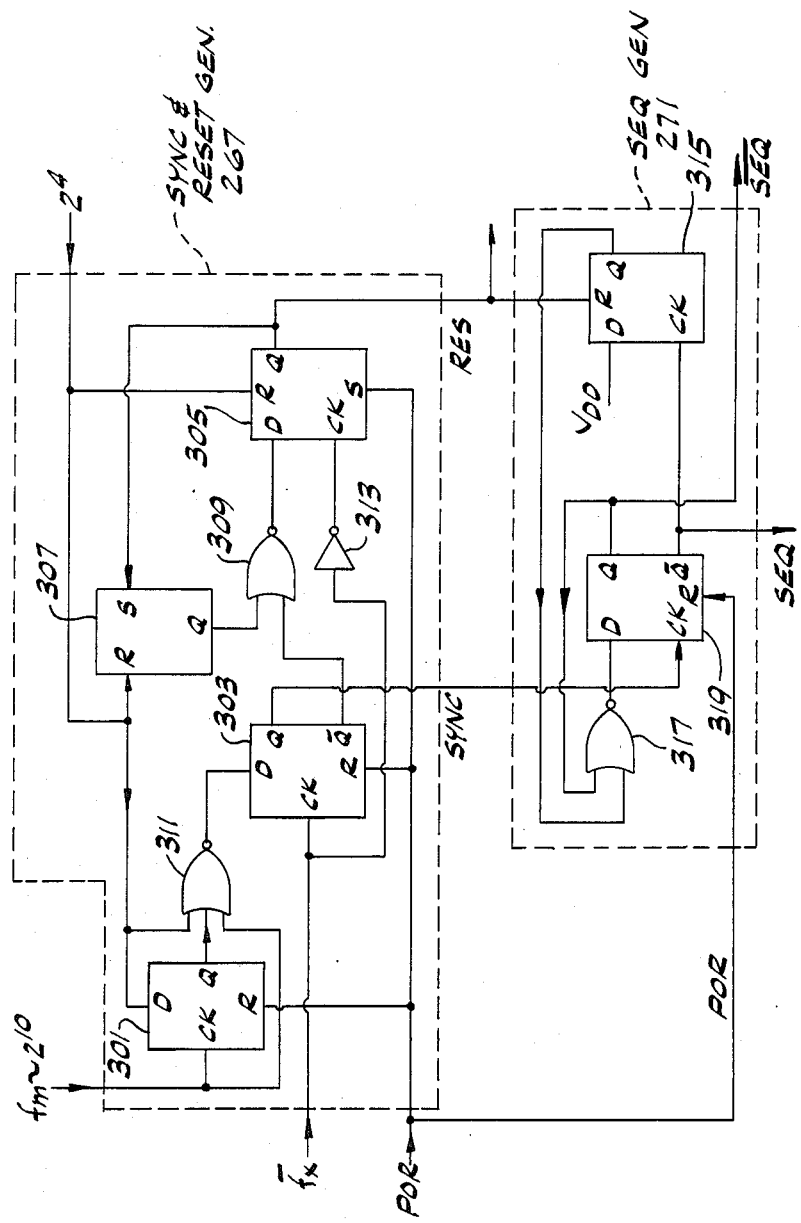
FIG. 15 is a logic circuit diagram of a synchronizing and reset generator and of a sequence generator of the circuitry of FIG. 14.

In FIGS. 14 and 15 a 16 Hertz signal designated $2^4$ from the Q output of 6 bit divider 265 is provided along with transducer output pulses $f_m$ and the complement $f_x$-bar of the clock pulses $f_x$ to sync and reset generator circuit 267. To understand the operation of circuit 267, assume in FIG. 15 that the time pulse $2^4$ (at top left in FIG. 14A) is initially high, resetting flipflops 305 and 307. Since time pulse $2^4$ is high the output of NOR gate 311 is initially low at the D input of flipflop 303. In this initial state NOR gate 309 is enabled by a Q output Low from flipflop 307 but the Q-bar output of flipflop 303 is high forcing NOR gate 309 to provide a data input Low to D flipflop 305. Pulses $f_m$ and clock pulses $f_x$-bar effect no changes in the Q outputs of flipflops 303 and 305, and these Q outputs are low, as shown for waveforms SYNC and RES in FIG. 14A as long as time pulse $2^4$ is high.

After time pulse $2^4$ goes low and before the first rising transition in pulses $f_m$ thereafter, flipflop 301 remembers the previous High from time pulse $2^4$ and provides a Q output high to NOR gate 311, keeping the D input of flip-flop 303 low. Thus waveforms SYNC and RES remain low. Referring again to FIG. 14A, an initial time T=0 in an illustrative 1/16 second period is defined as the instance of the first rising transition of the transducer 150 output pulses $f_m$ occurring after time pulse $2^4$ goes low. This rising transition in $f_m$ clocks flipflop 301 output Q low. At point 315 (FIG. 14A) $f_m$ is high, thereby directly providing a high to NOR gate 311, forcing the output from NOR gate 311 low now that $2^4$ is no longer high and the Q output of flipflop 301 is low. Clock signal $f_x$-bar clocks flipflop 303 but since its data input is still low, there is no change initially from an output Q Low and output Q-bar high at flipflop 303. Clock pulses $f_x$-bar are inverted by inverter 313 and fed to the clock input of flipflop 305. Since the data input of flipflop 305 is low, the Q output of flipflop 305 remains Low at high point 315 in transducer output pulses $f_m$.

When $f_m$ goes low at transition 317, the Q output of flipflop 301 is low, signal $2^4$ is low, and now $f_m$ is low. Consequently, the output of NOR gate 311 goes high at the data or D input of flipflop 303. Clock pulse $f_x$-bar very shortly thereafter clocks the Q output of flipflop 303 high, providing the signal SYNC as a High to sequence generator 271. The Q-bar output of flipflop 303 simultaneously goes low. Now, NOR gate 309 goes high at the data input of flip-flop 305. Half a clock cycle later, as suggested by interval 320 of FIG. 14A, inverter 313 clocks flipflop 305 output Q high, setting flipflop 307 Q output high, and forcing the output of NOR gate 309 Low at the D input of flipflop 305. Since reset signal RES is the Q output of flipflop 305, it occurs as shown in FIG. 14A. Then after another cycle of the one megaHertz clock output of inverter 313, flipflop 305 is clocked low and the reset signal RES of FIGS. 14A and 15 is completed and provided to the sequence generator 271.

In sequence generator 271 signal RES resets D flipflop 315 providing a Q output Low to enable NOR gate 317. D flipflop 319 has its Q output intitially low due to reset signal POR so that when signal RES is provided, NOR gate 317 sends an output high to the data input of flipflop 319. However, because the rising transition of signal SYNC occurs slightly prior to the reset signal RES, flipflop 319 does not have the high from NOR gate 317 clocked to its Q output until later. Thus, sequence pulse SEQ continues to be high, and its complement SEQ-bar continues to be low, subsequent to the reset pulse RES.

At sync and reset generator 267 signal $f_m$ returns high at time 321, forcing NOR gate 311 output low at the D input of flipflop 303. As soon as clock pulse $f_x$-bar goes high it clocks flipflop 303 output Q (SYNC) low, which has no effect on flipflop 319 because the clock (CK) input is responsive only to rising transitions. However, when $f_m$ goes back low at time 322, the output of NOR gate 311 goes high and clock pulse $f_x$-bar clocks flipflop 303 Q output back on at the time 322. The transition in the Q output of flipflop 303 at time 322 constitutes a rising transition in pulses SYNC which clocks the flipflop 319, finally latching its D input High to its Q output. The transition to a High at the Q output of flipflop 319 causes sequence pulse SEQ-bar to go high and sequence pulse SEQ to go low. This condition remains for a full cycle of the waveform SYNC until time 324. The high Q output SEQ-bar of flipflop 319 forces the output of NOR gate 317 low. Then at time 324 the rising transition in SYNC clocks flipflop 319 and latches the low from NOR gate 317 through to the Q output. The resulting Q output low at flipflop 319 makes SEQ-bar Low and SEQ high. The transition in SEQ going high clocks flipflop 315 and latches the logic one provided by supply voltage $V_{DD}$ to the Q output. The resulting Q output High at flipflop 315 thereby holds the NOR gate 317 output Low for the rest of the relatively long time when time pulse $2^4$ is low.

The time pulse $2^4$ ultimately goes high at time 326, forcing the output of NOR gate 311 low and resetting flipflops 305 and 307 and providing a data input one at flip-flop 301. Signal $f_m$ clocks flipflop 301 high, also forcing NOR gate 311 to logic zero at flipflop 303. Flipflop 303 is soon clocked by clock pulses $f_x$-bar so that pulse SYNC goes low and stays low, thus providing the conditions for starting the process all over again when time pulse $2^4$ again goes low at a new "sample."

Figure 16:
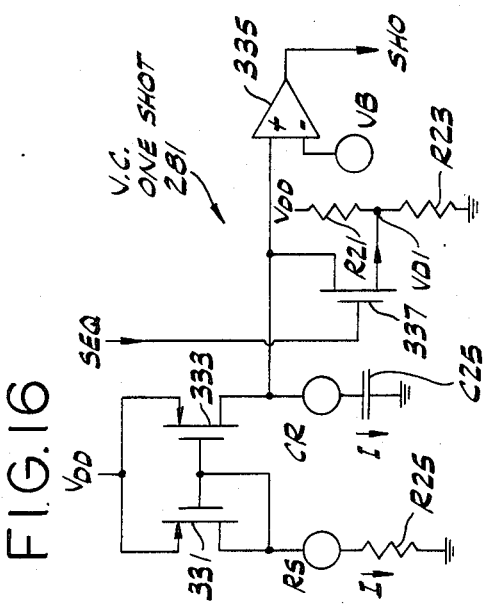
FIG. 16 is a schematic diagram of a voltage controlled one-shot circuit for use in the circuitry of FIG. 14.

FIG. 16 illustrates a voltage controlled one-shot circuit for block 281 of FIG. 14 suitable for implementation on an integrated circuit chip. P-type enhancement FETs 331 and 333 are connected with their sources returned to supply voltage $V_{DD}$, and with gates connected together and with the drain of FET 331 to current setting resistor R25 through pin RS. FETs 331 and 333 are thus wired in a current mirror configuration, which provides the same magnitude of current I as is flowing to resistor R25, to capacitor C25 from the drain of FET 333 at integrated circuit pin CR. A ramp-shaped charging voltage output at pin CR is provided to comparator 335, which provides as its output the signal SHO. Comparator 335 provides signal SHO of FIG.

14A by comparing the voltage VB related to the blower voltage with the ramp voltage at pin CR.

Comparing FIG. 14A with FIG. 16, it is observed that signal SEQ begins high, turning n-type enhancement FET 337 on and clamping the voltage of capacitor C25 to a voltage VD1. Voltage VD1 is produced by a voltage divider consisting of resistors R21 and R23 connected between supply voltage $V_{DD}$ and ground. Voltage VD1 is set at a level just sufficient to keep output SHO low from comparator 335 at the lowest positive selection of voltage provided to pin VB. Then, when signal SEQ goes low, FET 337 turns off, releasing pin CR from clamp action, and capacitor C25 is permitted to charge with the ramp-shaped charging curve. After time interval 289 the voltage at the non-inverting input of comparator 335 increases sufficiently to make output SHO high. Capacitor C25 continues to charge until it reaches supply voltage $V_{DD}$ through FET 333. Thus, after time interval 289 the voltage applied to the noninverting input of comparator 335 keeps SHO high as long as pulse SEQ remains low. When SEQ returns high, it again turns on FET 337 and discharges capacitor C25 to the voltage VD1 of the voltage divider, which causes output SHO from comparator 335 to return low. It is observed that the voltage controlled one-shot 281 operates to provide the signal SHO in a manner such that the period of time 289 just after the commencement of pulse SEQ and ending with signal SHO going high is arranged to be negligible at the lowest selectable blower voltage and linearly related to blower voltage in general. By analogy with Graph 26B of FIG. 26, the x-axis intercept of the linear relationship of interval 289 to blower voltage is set by voltage VD1, and the slope of the linear relationship is set by resistor R25.

Figure 17:
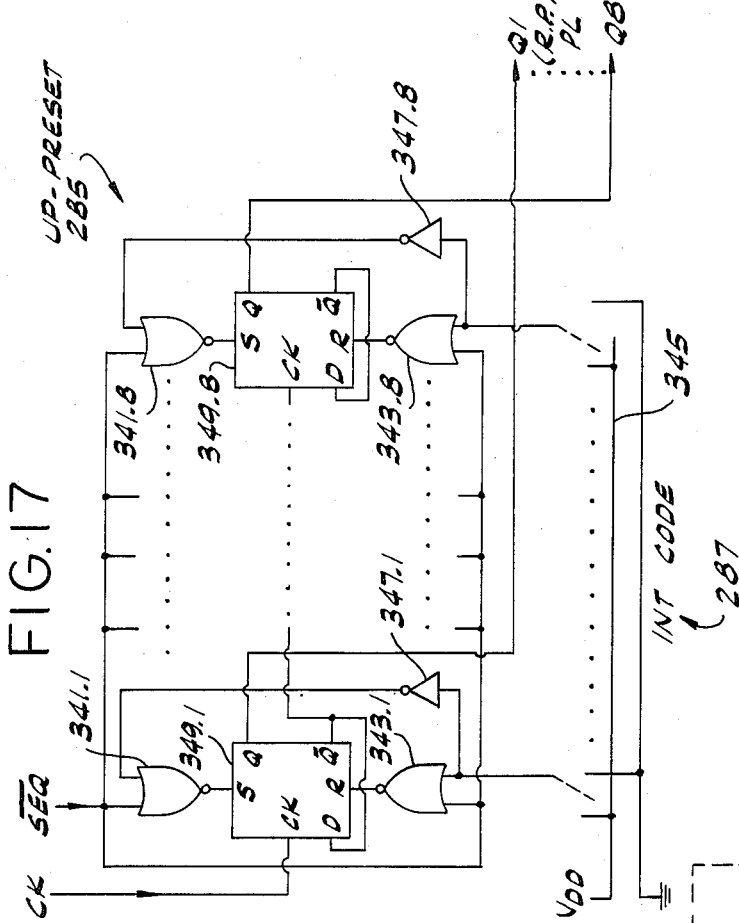
FIG. 17 is a logic circuit diagram of an up counter circuit for providing a digital signal corresponding to a reference repetition period for representing a selected low pressure limit for use in the circuitry of FIG. 14.

In FIG. 17 the circuit and operation of the preset up counter 285 of FIG. 14 is next described. In FIG. 14A it is observed that timing pulse SEQ-bar begins Low. This Low of SEQ-bar at FIG. 17 enables NOR gates 341.1 through 341.8 and NOR gates 343.1 through 343.8. A hardwired internal code 287 set by connections 345 to supply voltage $V_{DD}$, or to ground, for each respective one of 8 bits is conducted to the NOR gates 342.1 through 343.8 and inverted and provided to NOR gates 341.1 through 341.8 through inverters 347.1 through 347.8. Thus, each high bit connected to supply voltage $V_{DD}$ sets respective ones of D flipflops 349.1 through 349.8 to a Q output of 1, and each ground connection in the internal code 287 resets the respective remaining ones of flipflops 349.1 through 349.8 to a Q output of 0. So long as timing pulse SEQ-bar is 0, the hard-wired internal code 345 is held and preset on the 8 counter flipflops 349.1 through 349.8 and provided as outputs Q1 through Q8 along the 8 bit bus for providing the code corresponding to the repetition period (RP) of the highest selectable low pressure limit (PL4 of FIG. 26). It is to be noted that FIG. 17 is intended to suggest an 8 bit counter with 8 flipflops and associated NOR gates and inverters. The first and eighth stages of the circuit 285 and drawn in FIG. 17, and the intermediate 6 flipflops with their NOR gates and inverters are omitted for clarity and conciseness.

When sequence pulse SEQ-bar goes high, the outputs of NOR gates 341.1 through 341.8 and NOR gates 343.1 through 343.8 are forced low, thereby permitting the counter 285 to count up in response to any input pulses at clock input CK. Referring to FIG. 14A, to the graph of pulses designated UP-PRESET, it is noted that these pulses are clock pulses which have been continuously available at the output of NOR gate 283 of FIG. 14. Because SEQ-bar was intially low, up counter 285 did not respond to them. When SEQ-bar goes high, the up counter flipflops 349.1 through 349.8 count up during the time period 289. Then when pulse SHO goes high, the output of NOR gate 283 is forced low. Availability of pulses at the clock input CK of up counter 285 ceases until SHO goes back low.

In this way the voltage controlled one-shot 281, preset up counter 285, and NOR gate 283 of FIG. 14 constitute means for receiving any one of a plurality of voltage levels indicative of the blower speed selections and converting the any one voltage level to a second digital signal being the selected one low pressure electrical reference signal. Also, it is noted that the same circuitry constitutes means for receiving any one of a plurality of voltage levels respectively indicative of a selected one of a plurality of limits, and in response to timing pulses, are exemplified by sequence pulses SEQ and SEQ-bar, repeatedly generating a second set of digital bits, or second digital signal, representing the selected limit by providing a third set of digital bits, or third digital signal, by the internal code 287 representing a highest limit of the plurality of limits and adding a binary number related to the received voltage level to the third digital signal to generate the second digital signal in up counter 285. The circuitry for generating the second digital signal in this preferred embodiment adds by counting block pulses up from the binary value of the third digital signal in the internal code 287 for a period of time 289 related to the received voltage level.

Figure 18:
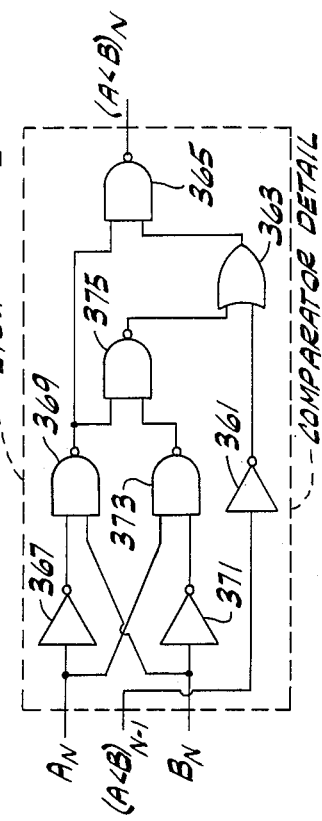
FIG. 18 is a logic circuit diagram of a comparator cell for use in a comparator circuit in FIG. 19.
Figure 19:
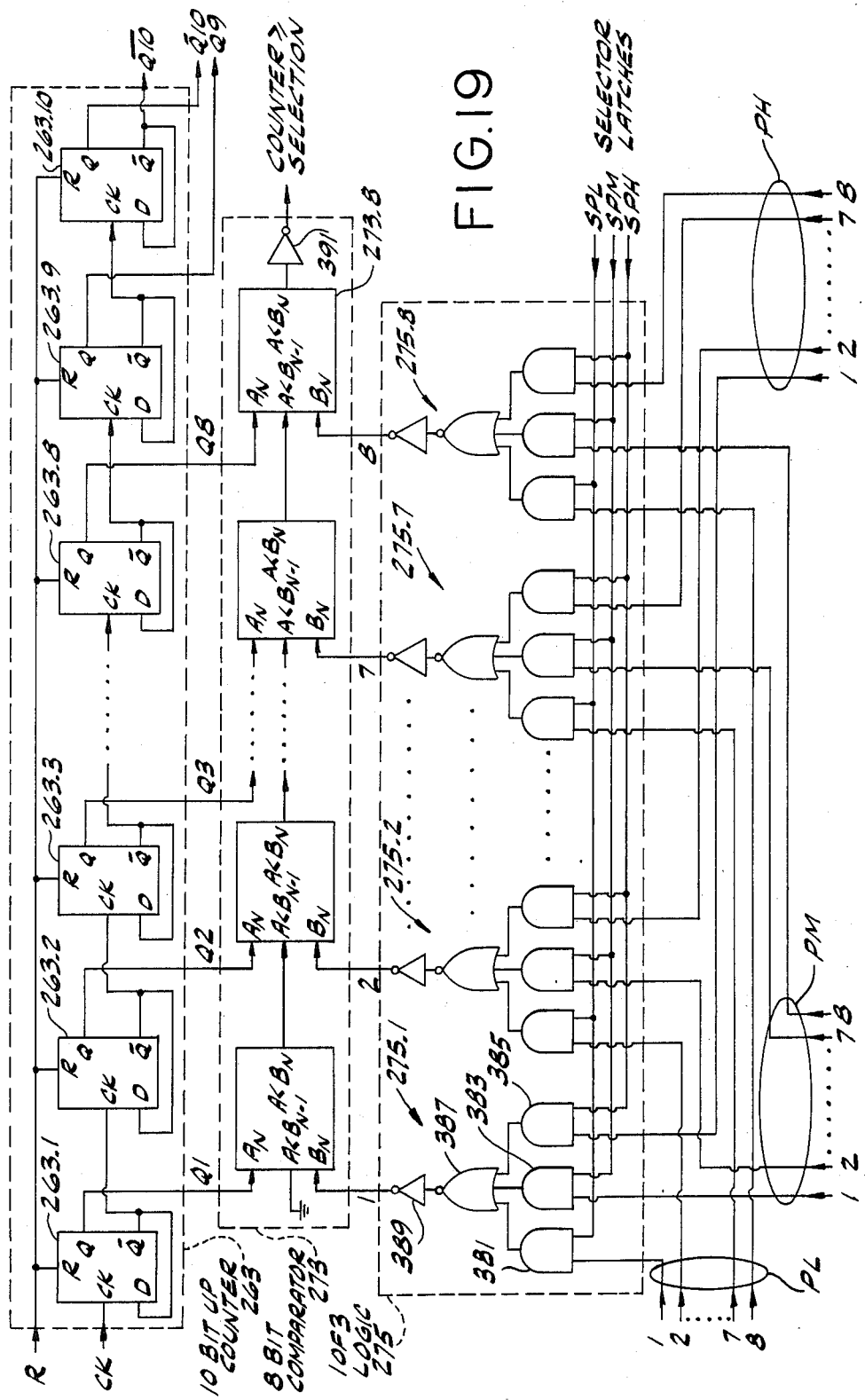
FIG. 19 is a logic circuit diagram of a ten bit up counter, eight bit comparator, and one-of-three logic circuit for use in the circuitry of FIG. 14.

FIG. 18 shows a logic diagram of a single one circuit cell designated 273.i of 8 identical cells utilized in the comparator 273 of FIGS. 14 and 19. It is seen that each cell 273.i has an input (left center in FIG. 18) for the result (A less than B)$_{N-1}$ of the comparison in the next less significant cell 273.i−1. Cell 273.i also has inputs for bits $A_N$ and $B_N$ from up counter 263 and one-of-three logic 275 respectively. Cell 273.i provides an output (A less than B)$_N$ to the next more significant cell 273.i+1. The concept of the circuit cell 273.i is that if $A_N$ equals or exceeds $B_N$, then the output of NAND gate 365 is a logic zero regardless of the input from cell 273.i−1. If $A_N$ is less than $B_N$, then the output of NAND gate 365 is a logic one regardless of the input from cell 273.i−1. However, if $A_N$ is equal to $B_N$, then the output of NAND gate 365 is identical to the input from cell 273.i−1. This is because cell 273.i is providing a comparison of a binary number consisting of $A_N$ and all less significant A bits provided to less significant cells with a binary number consisting of $B_N$ and all less significant B bits provided to the less significant cells. Thus when $A_N$ and $B_N$ are different, the comparison of the binary numbers does not depend on comparing the less significant bits. But when $A_N$ and $B_N$ are the same, the comparison of the binary numbers depends totally on comparing the less significant bits.

The operation of the circuit cell 273.i is now described in more detail. If $A_N$ and $B_N$ are different, then by action of inverters 367 and 371, one of the NAND gates 369 and 373 will be presented with a pair of input Highs and will produce an output Low. The output Low forces NAND gate 375 output high, enabling NAND gate 365 through OR gate 363. If $A_N$ is the greater (1) bit, NAND gate 369 is forced high by a low output from inverter 367, and NAND gate 365 output correctly goes low. If $B_N$ is the greater (1) bit, NAND gate 369 goes low because the inverter 367 provides a one in response to the zero bit $A_N$. The output Low from NAND gate 369 forces NAND gate 365 to correctly provide a high output. If $A_N$ and $B_N$ are the same, the outputs of NAND gates 369 and 373 will both be forced high, causing the output of NAND gate 375 to go low and enable OR gate 363. The high output of NAND gate 369 will also enable NAND gate 365. Then by the successive inverting actions of inverter 361 and enabled NAND gate 365, the comparing input (A less than B)$_{N-1}$ from cell 273.i−1 produces an identical output from NAND gate 365.

Figure 20:
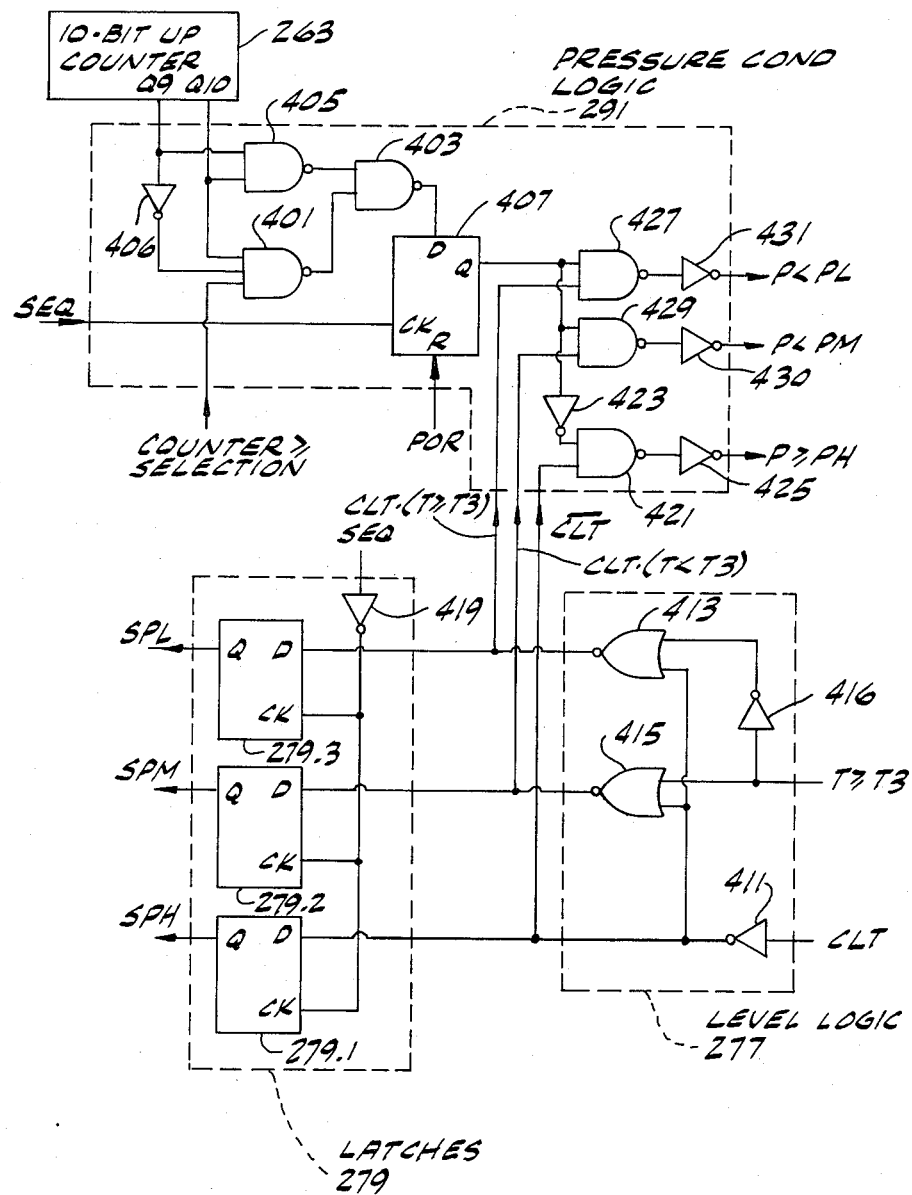
FIG. 20 is a logic circuit diagram of pressure condition logic, level logic, and latches for use in the circuitry of FIG. 14.

In FIG. 19, a more detailed diagram of the 10-bit up counter 263, 8 bit comparator 273, and one-of-three logic 275 of FIG. 14 is shown. 10-bit up counter 263 has each of its 10 D flipflops reset by signal RES at the time indicated in FIG. 14A. Then clock pulses at 1 megaHertz continue to be provided to the clock input CK of the least significant bit flipflop 263.1. Flipflops 263.1, 263.2, 263.3, . . . 263.8, 263.9, and 263.10 count up to clock pulses during time period 382 in FIG. 14A. The onset of the timing pulse SEQ-bar going high at time 417 disables the NOR gate 261 (FIG. 14) and stops the up-counting in counter 263. Then, outputs Q1, Q2, Q3 . . . Q8 represent the bits from least significant to most significant for presentation to the comparator 273 at the $A_N$ inputs of each cell 273.i thereof. The use of the two most significant bits Q9 and Q10 is discussed in connection with FIG. 20. In general the skilled worker provides as many flipflops in counter 263 as are necessary to produce distinct counts for each pressure in a normal working pressure range of the transducer 150. In the present embodiment it is found that actual counts can clock nonzero values into flipflops 263.9 and 263.10, but in the normal working range the bits stored in flipflops 263.9 and 263.10 at the end of the count are the same for every count in the range. Accordingly, it is unnecessary to provide Q9 and Q10 to comparator 273. Instead, any departure of Q9 and Q10 from the expected bits is interpreted as a departure from the normal range, for which circuitry in FIG. 20 is provided.

One-of-three logic 275 provides one at a time of either a second, third or fourth set of digital bits (also called second, third, or fourth digital signals herein) respectively from the low pressure limit PL bus, the high pressure limit PH bus, and the low charge pressure limit PM bus. One-of-three logic 275 picks the PL bus, the PM bus or the PH bus in response to signals SPL, SPM, and SPH from selector latches 279 of FIG. 20. One-of-three logic 275 employs 8 identical sections 275.1, 275.2 . . . 275.7, and 275.8. Since these sections are identical, only section 275.1 is described further. Section 275.1 includes AND gates 381, 383, and 385 feeding NOR gate 387. NOR gate 387 feeds inverter 389, which in turn provides the $B_N$ input to the corresponding bit cell 273.i of 8 bit comparator 273.

It is contemplated that in this embodiment only one of the signal lines SPL, SPM, and SPH is high at any given time. Signal line SPH is connected to and enables each AND gate 385 for passing each bit on each line of the high pressure limit bus PH. The signal line SPM is connected to and enables each AND gate 383 for passing each bit on each line of the low charge pressure limit bus PM. The signal line SPL is connected to and enables each AND gate 381 of each section in one-of-three logic 275 for passing each bit on each line of the low pressure limit bus PL.

It will be recalled from FIG. 14A that a short time period 289 into the duration of pulse SEQ-bar is required to count up on counter 285 of FIG. 14, to produce the signal on the bus for low pressure limit PL. From the standpoint of the operation of 8 bit comparator 273, this is not a problem as plenty of time is left in the duration of pulse SEQ-bar for the comparator 273 to settle. When 8 bit comparator 273 has settled, the output of the most significant bit cell 273.8 is fed to inverter 391. Inverter 391 provides an output High when the contents of counter 263 are greater than or equal to the pressure limit repetition period selection provided to comparator 273 by the one-of-three logic 275. Since counter 263 holds contents representing repetition period of the pulses from the pressure transducer 150, and such repetition period is inversely related to pressure, an output 1 from inverter 391 means that the refrigerant pressure is less than the pressure limit PL, PM, or PH represented by the bits supplied as inputs $B_N$ to comparator 273 from one-of-three logic 275. Conversely, when the output of inverter 391 is a 0 the refrigerant pressure is indicated to be equal to or exceeding the pressure limit.

It will be understood that a variety of binary representations of repetition periods for the pressure limits can be selected by the skilled worker for use in practicing the invention. An example of some coding of such binary representations utilized in the preferred embodiment is as follows. From the least significant bit on each bus line 1 through most significant bit on each bus line 8, the following pressures correspond to the following codes:

28.5 PSIG—00000011
30.0 PSIG—00011101
45.0 PSIG—11101110

In the preferred embodiment the circuit for the transducer 150 is adjusted and arranged so that between the lowest and the highest refrigerant pressures to be normally encountered, the counter 263 will count so that the most significant bit Q10 is a 1 and so that Q9 is a 0 at the end of the count at time 417 of FIG. 14A. This corresponds to using a middle range in the counter of between decimal numbers 512 through 767. The use of such middle range provides an additional advantageous feature in that a modicum of high and low pressure limit checking can be provided even if comparator 273 malfunctions.

Referring now to FIG. 20, 10 bit up counter 263 outputs Q9 and Q10 are provided as the two most significant bits of the electrical digital signal responsive to the refrigerant fluid pressure P, to pressure condition logic circuit 291 together with the "COUNTER-greater-than-or-equal-to-SELECTION" output of comparator 273. Pressure condition logic circuit 291 latches out comparison signals P-LT-PL, P-LT-PM, and P-GT-PH in response to the rising transition in sequence timing pulse SEQ at time 409 of FIG. 14A. Also, the pressure condition logic circuit 291 is responsive to certain conditions in the clutch energizing circuitry 170 of FIGS. 11 and 21 so that only one of three lines is respectively enabled for transmission of one of the three pressure comparison signals P-LT-PL, P-LT-PM or P-GT-PH at any given time.

Assume for analysis that Q9 is 0 and Q10 is 1 from the up counter 263 as expected after a count. Then, three-input NAND gate 401 is enabled and the output of the comparator 273 is coupled through to NAND gate 403 which has been enabled by NAND gate 405. The output of the comparator survives unchanged in logic level because of the 2 NANDs 401 and 403 and arrives at the data (D) input of latch 407. Subsequently, sequence timing pulse SEQ clocks latch 407 at time 409 of FIG. 14A, and the data input is provided at the Q output.

Now assume for analysis that Q9 and Q10 are both 0. This means that the 10 bit up-counter 263 has counted a relatively high repetition rate, which means pressure high out of range. The two Lows from Q9 and Q10 cause the output from NAND gate 405 to go high thereby enabling NAND gate 403. NAND gate 401 has its output forced high by Q10 thereby providing a low output from NAND gate 403 to flipflop 407. Thus, an output 0 from flipflop 407 is correctly provided, indicating that the transducer pressure is greater than a pressure limit.

Next suppose that Q9 and Q10 are both 1, that is, both high. This corresponds to a very high count in counter 263, indicating a refrigerant pressure low out of range in this preferred embodiment. With both Q9 and Q10 high NAND gate 405 output is forced low, thereby forcing NAND gate 403 output high to the data input of flipflop 407, correctly reflecting that the counter 263 contents indicate a pressure less than a low pressure limit.

It will be recognized of course, that in another embodiment of the invention more or different high order bits (such as a Q11) can be provided, and the circuit involving gates 401, 403, 405, and inverter 406 would be redesigned in accordance with the principles herein. Also the outputs Q9 and Q10 can be dispensed with altogether in another embodiment with the comparator 273 output directly connected to the D input of flipflop 407.

Use of the pressure condition logic 291 of FIG. 20 in comparing circuit 255 of FIG. 11 makes comparing circuit 255 additionally responsive to the at least two most significant bits Q10 and Q9 so as to provide a compare signal from NAND gate 403 if the pressure P reaches a predetermined high pressure and if the pressure reaches a predetermined low pressure, regardless of the result ("COUNTER-GT-SELECTION") of comparing the electrical digital signal from up counter 263 with each electrical digital reference signal provided by reference level generator 257. NAND gates 401, 403, and 405, with inverter 406 constitute logic means responsive to a binary value 11 as the two most significant bits of the pressure-responsive electrical digital signal from up counter 263 for providing a first logic level as the compare signal to the data D input of flipflop 407, and responsive to "0" as the most significant bit for providing the logical complement of the first logic level as the compare signal. Thus, a control signal such as the comparison signal P-LT-PL is produced in response to any occurrence of at least one predetermined combination, e.g. "11", of the two most significant bits Q10 and Q9 regardless of the result of comparing of the pressure-responsive electrical digital signal from up counter 263 and any digital reference signal, and the air conditioning heat transfer system is advantageously turned off thereby.

Further discussion of level logic 277 and latches 279 is deferred until after discussion of the circuitry 170 of FIG. 21. The circuitry 170 of FIG. 21 among other things produces a clutch control signal CLT and a low charge time period signal T-GT-T3 as feedback inputs to level logic 277.

The circuitry 160 of FIGS. 12 and 14 is advantageously used with air-conditioning clutch energizing circuitry 170 as shown in FIG. 21.

In FIG. 21 the circuitry 170 constitutes means responsive to the comparing circuitry 255 in FIG. 14 for energizing the clutch 87 when the refrigerant pressure P exceeds the high pressure limit PH and for deenergizing the clutch when refrigerant pressure P falls below the selected low pressure limit PL. More generally speaking, FIG. 21 involves a switching circuit responsive to comparison signals P-LT-PL, P-LT-PM, and P-GT-PH indicating that a physical variable, here refrigerant pressure P, has reached or crossed a specified limit or level. The clutch 87 is switched by N-channel enhancement MOSFET 451 (designated MS in FIG. 2) in response to electrical drive related to clutch control signal CLT. Clutch control signal CLT is provided through amplifier 453 to integrated circuit pin CN. Clutch control signal CLT also is inverted by inverter 455 and amplified by amplifier 457 and provided at integrated circuit pin CN-bar. The complement of CLT from inverter 455 is used to enable NOR gate 459 when the clutch is supposed to be energized or engaged, corresponding to CLT high.

Pulses PMP from divider 219 of FIG. 12 are fed through NOR gate 459 and amplifier 461 to pin GP when CLT is high. Protective diodes D463 and D465 prevent the output of amplifier 461 from rising above supply voltage $V_{DD}$ or falling below ground potential. Pulses PMP are converted into drive for turning on FET 451 by means of resistor 467, diode D469, and capacitor 471. In the absence of pulses PMP the 12 volts provided through resistor 467 and diode D469 is insufficient to turn the FET 451 on. The capacitor 471 is initially charged to 12 volts relative to pin GP through resistor 467. Then, pulses PMP raise the voltage of pin GP to $V_{DD}$, thereby providing advantageously adequate pulsating gate voltage to FET 451. The pulsating gate voltage is equal in approximate peak value to the sum of $V_{DD}$ and 12 volts, or about 20 volts.

When the clutch control signal CLT goes low, indicating that the clutch 87 is to be deenergized or disengaged, then the pin GP voltage goes low and pin CN-bar voltage goes high. The high CN-bar voltage turns on transistor 473, reducing the voltage across capacitor 475 and resistor 477 to zero and turning the FET 451 hard off. Fly-back diode D479 prevents switching voltage transients from attaining high voltages which might damage FET 451.

The clutch energizing circuitry 170 includes a clutch controller circuit 491 and a timed control circuit 492. The clutch controller circuit 491 constitutes means for generating the clutch control signal CLT and thereby energizing the clutch 87 when high pressure comparison signal P-GT-PH is on after a first predetermined time period following termination of the clutch control signal, and for terminating the clutch control signal CLT when low pressure comparison signal P-LT-PL is on subsequent to a second predetermined time period T2 after the clutch control signal CLT has commenced being generated.

Low charge circuit 493 responds to the comparing circuit 255 of FIG. 14 to deenergize or disengage the clutch 87 when refrigerant pressure P repeatedly falls from the high pressure level or limit PH to the low charge pressure level or limit PM within a preestablished or predetermined period of time T3. Low charge circuit 493 constitutes means responsive to low charge pressure comparison signal P-LT-PM for detecting a low charge of refrigerant in the air-conditioning system, the detecting means responding to repeated instances of refrigerant pressure P falling below the low charge pressure limit within the third predetermined period of time T3 so that the detecting means terminates the clutch control signal CLT. It is noted that low charge circuit 493 is sensitive to changes in refrigerant pressure over predetermined period of time T3, and more specifically to a predetermined number of consecutive instances of excessive rate of change in the refrigerant pressure P. For example, in the preferred embodiment, detecting a pressure drop from 45 psig to 30 psig occurring in less than 1.75 seconds amounts to utilizing a rate of change threshold of 8.6 psig/second.

The predetermined periods of time T1, T2, and T3 are selected for example to be 8 seconds, 5 seconds, and 1.75 seconds respectively. They are determined by bipolar transition detector 501, time reset circuit 503, 7-bit frequency divider 505, T2 second decoder 507, T1 second decoder 509, and T3 second decoder 511, all of which constitute timer means or timed control circuit means responsive to the clutch control signal CLT for enabling the clutch controller circuitry 491 to respond to high pressure comparison signal P-GT-PH when the first predetermined time period T1 has elapsed, and for enabling the clutch controller circuitry to respond to low pressure comparison signal P-LT-PL when the second predetermined time period T2 has elapsed. The timed control circuit 492 also enables the low charge circuit 493 when the third predetermined time period T3 has elapsed after the clutch signal has commenced being generated.

Figure 27:
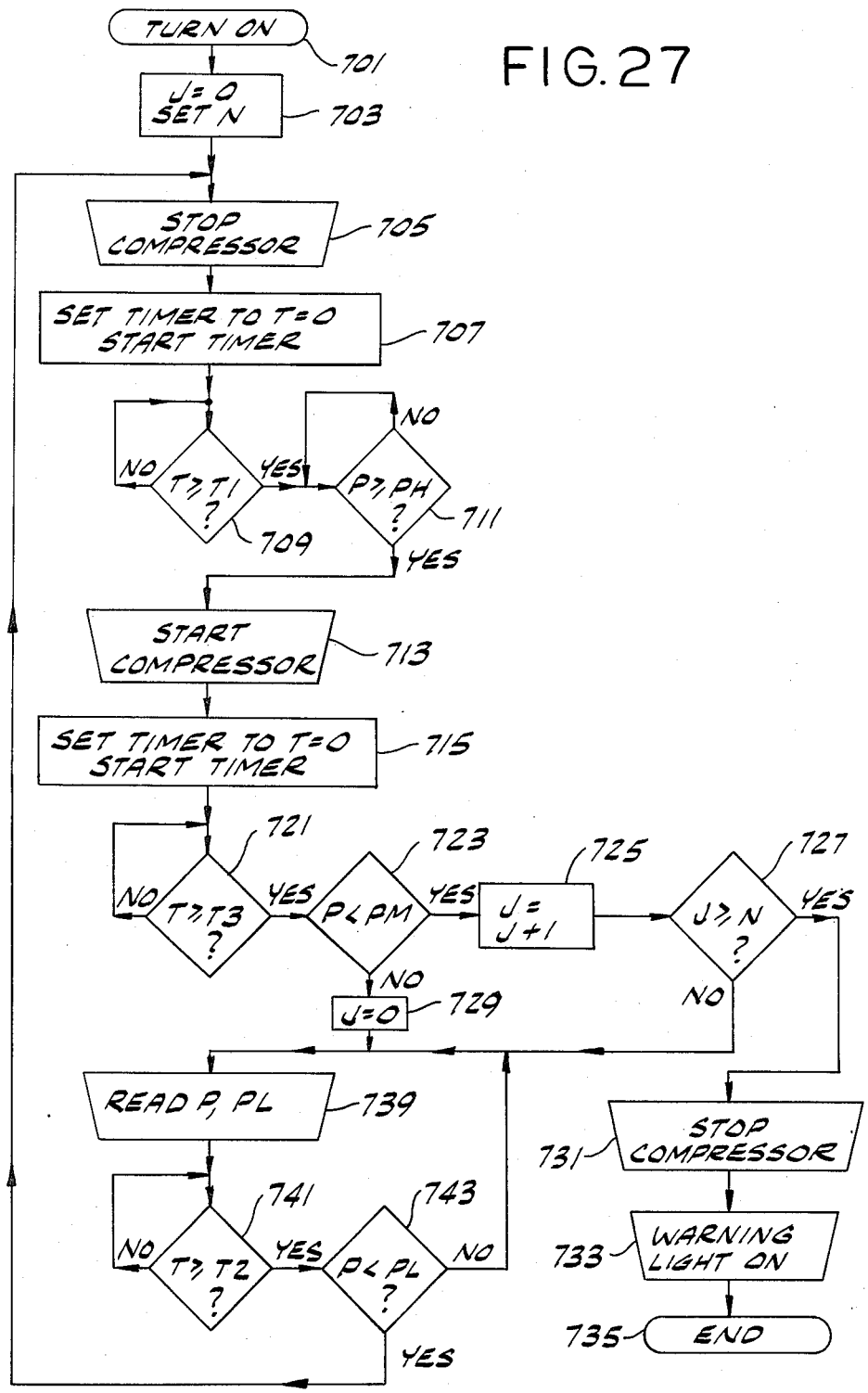
FIG. 27 is a flow chart of operations of the circuitry of FIGS. 12, 14 and 21.

The operations of the preferred embodiment are now described in more detail with particular reference to the logic circuit diagram of FIG. 21 and the flowchart of FIG. 27. When the circuitry of FIGS. 12, 14, and 21 is first turned on, the POR-bar signal applied to NAND gate 539 is low, causing NAND gate 539 output to be high, setting RS flipflop 521 Q output high in FIG. 21. Then flipflop 521 forces clutch control signal CLT low through NOR gate 523, deenergizing clutch 87 and stopping the compressor 81 (step 705 of FIG. 27). The occurrence of clutch control signal CLT going low activates bipolar transition detector 501 which resets divider 505 through time reset circuit 503. Divider 505 counts up from time 0 (step 707 of FIG. 27). When the time elapsed exceeds the predetermined time interval T1, decoder 509 enables AND gate 525 on line Y2. Since clutch control signal CLT is low, the output of inverter 527 is high at this time. Pulse POR-bar is also high, causing the output of NAND gate 531 to go low, lifting a reset from input R of flipflop 529. Inverter 527 also provides a High to AND gate 525, setting RS flipflop 529. The Q output of flipflop 529 is high, indicating that elapsed time is greater than or equal to T1 and enabling AND gate 533. When the pressure comparison signal P-GT-PH goes high, indicating that the high pressure limit PH has been reached, then the output of NAND gate 533 goes high, resetting flipflop 521. The output Q of flipflop 521 goes low, resulting in clutch control signal CLT as the output of NOR gate 523 going high. The operations just described corresponds to time comparison branch 709 and high pressure branch 711 of FIG. 27. When clutch control signal CLT goes high, clutch 87 is energized and the compressor is started (step 713 of FIG. 27). This transition in clutch control signal CLT is detected by the transition detector 501, which resets the 7-bit frequency divider 505 through circuit 503 (step 715 of FIG. 27). Now, in FIG. 21 clutch control signal CLT is high at inverter 527. Inverter 527 goes low, forcing AND gate 525 low and NAND gate 531 high, resetting flipflop 529. The Q output of flipflop 529 goes low forcing the output of AND gate 533 low, and lifting the reset from flipflop 521. However, the Q output of flipflop 521 does not change state until a set input is received.

Clutch control signal CLT now enables T2 second decoder 507. The output of NAND gate 541 goes low and lifts the reset from flipflop 535 now that both POR-bar and CLT are high. After the second predetermined period of time T2 elapses, a high pulse is generated by decoder 507 on line Y1 and sets flipflop 535 output Q high and enables NAND gate 537. The high output from flipflop 535 indicates to the system that the second predetermined time period has elapsed (step 741 of FIG. 27) and that attention can now be given to the low pressure comparison signal P-LT-PL, when it arrives. With the clutch 87 engaged the air-conditioning system of FIG. 10 operates to cool air by means of evaporator EV and the pressure in the suction line 81 falls. When the pressure falls below the selected low pressure limit PL corresponding to the given blower voltage $V_{BL}$, the low pressure comparison signal P-LT-PL goes high (step 743 of FIG. 27), making the output of NAND gate 537 Low. The low output of NAND gate 537 forces the output of NAND gate 539 high and sets flipflop 521. The high Q output of flipflop 521 forces clutch control signal CLT low as the output of NOR gate 523, deenergizes the clutch, and stops the compressor (step 705 in FIG. 27). When clutch control signal CLT goes low, NAND gate 541 is forced high, resetting flipflop 535 and thereby disabling NAND gate 537 in the upper portion of clutch controller 491. Correspondingly, inverter 527 enables AND gate 525 and thereby reactivates the lower portion of clutch controller 491. In this way a new cycle of operation is commenced with the circuitry looking for refrigerant pressure P to reach the high pressure limit PH once again.

Timed control circuit 492 is responsive to time base signal $2^4$-bar and constitutes timed control means for providing a first pulse Y2 when the first predetermined time period T1 has elapsed after the clutch energizing signal CLT has been terminated and for providing a second pulse Y1 when the second predetermined time period T2 has elapsed after the clutch energizing signal CLT has been initiated. Flipflop 521 constitutes flipflop means having a first output state during which the clutch energizing signal CLT is generated and a second output state during which no clutch energizing signal CLT is generated. The rest of the clutch controller circuit 491 besides flipflop 521 constitutes means for coupling the low pressure comparison signal P-LT-PL and the high pressure comparison signal P-GT-PH to flipflop 521, the timed control circuit enabling the coupling means by the first pulse Y2 so that the high pressure comparison signal P-GT-PH is able to set flipflop 521 to the first output state, the timed control circuit 492 enabling the coupling means by the second pulse Y1 so that the low pressure comparison signal P-LT-PL is able to set flipflop 521 to the second output state. Thus timed control circuit 492 also constitutes timer means for preventing response by the switching circuit of FIG. 21 to a control signal such as any of the comparison signals until a predetermined time period T1 or T2 has elapsed. In this way the circuitry of FIG. 21 has means responsive to the timed control circuit 492 and to the comparing circuit 255 of FIG. 11 for actuating and deactuating the system only after a predetermined time period T1 or T2 following each immediately preceding or next-previous deactuation and actuation respectively, and the signal CLT is indicative of operational state of the heat transfer system.

Now reference is made to the low charge circuit 493 in FIG. 21. When the clutch control signal CLT is on, the T3 second decoder 511 counts off a preestablished low charge time period T3. When this time period T3 has elapsed, a high signal is generated on line Y3 and sets flipflop 543, producing an output Q high. This output Q high is fed to a count detector 545 and also provides a low charge time signal T-GT-T3 which is fed back into the circuitry of FIG. 14 and FIG. 20. The operations of decoder 511 correspond to T3 branch 721 of FIG. 27. The operations of the count circuit 545 correspond to steps 723, 725, 727 and 729 of FIG. 27. If a sufficient number of consecutive instances of refrigerant pressure P falling below the low charge pressure limit PM occur within preestablished time period T3, then the count detector 545 produces a high output Q which through NOR gate 523 forces the clutch control signal CLT low. This, of course, deenergizes the clutch 87 and stops the compressor as indicated at step 731 of FIG. 27 and turns on warning light LD1 through amplifier 547 in step 733 of FIG. 27.

Low charge circuit 493 constitutes means for generating a low charge signal and actuating the low charge indicator (e.g., light emitting diode LD1) in response to repeated occurrences of the low charge pressure comparison signal P-LT-PM during different periods of energization of the compressor driving means (e.g. clutch 87) or during each of a predetermined number of successive intervals of clutch energization. NOR-gate 523 and clutch drive circuit 494 constitute in connection with the low charge operations, means responsive to the low charge signal for deenergizing the clutch 87 thereby to deactuate the compressor. Timed control circuit 492 in connection with the low charge operations constitutes means for timekeeping using the time pulses $2^4$-bar so as to generate a timekeeping output T-GT-T3 during a predetermined time period (the period after time period T3 has elapsed) in each of the intervals of clutch energization and ceasing the timekeeping output otherwise.

Returning to FIG. 20, the clutch control signal CLT and low charge time signal T-GT-T3 are provided as inputs to level logic circuit 277. The outputs of level logic circuit 277 enable one at a time of the three NAND gates 427, 429 and 421 which respectively feed a respective one of the comparison signals P-LT-PL, P-LT-PM, and P-GT-PH, as is appropriate in light of the logic levels of signal CLT and T-GT-T3.

For example, when clutch signal CLT is low, it is desired to compare refrigerant pressure P with the high pressure limit PH so as to know when to energize clutch 87 again. Accordingly, inverter 411 enables NAND gate 421 so as to provide a path for a comparison signal P-GT-PH. Inverter 411 also provides a high data input to latch 279.1. When sequence pulse SEQ goes low (time 417 in FIG. 14A), inverter 419 clocks latches 279.1, 279.2, and 279.3, setting only signal SPH high. When signal SPH goes high, one-of-three logic 275 of FIG. 19 provides bits corresponding to high pressure limit PH to comparator 273.

As mentioned before, the high CLT-bar output from inverter 411 enables NAND gate 421. A Q output High from flipflop 407 represents pressure P being less than a limit. However, it is desired to provide a comparison signal being a High as output from inverter 425 when the high pressure limit PH is exceeded. Accordingly, inverter 423 inverts the Q output of flipflop 407 and provides the result to the input of NAND gate 421. When NAND gate 421 is enabled, the result from inverter 423 is twice inverted by NAND gate 421 and inverter 425 and appears in the proper sense at the output of inverter 425 to provide the high pressure comparison signal P-GT-PH when the high pressure limit PH is in fact exceeded. At the same time NAND gates 427 and 429 are disabled by the low outputs of NOR gates 413 and 415 because of the high output from inverter 411 when CLT is low. Because NOR gates 413 and 415 are forced low, signals SPL and SPM are clocked low through latches 279.2 and 279.3.

When the clutch control signal CLT goes high, it is desired to provide comparison signals P-LT-PM and P-LT-PL if and when the refrigerant pressure P reaches low charge pressure limit PM and low pressure PL respectively. Accordingly, it is no longer desired to select high pressure limit PH on latches 279. When clutch control signal CLT goes high, inverter 411 goes low, thereby causing the SPH output of flipflop 279.1 to go low as soon as it is next clocked. Also at this time NOR gates 413 and 415 are enabled by the low output of inverter 411. Low charge limit PM is tested before time T exceeds T3. When T is less than T3, the low charge time signal T-GT-T3 is low, making the output of NOR gate 415 high and latching through a high for signal SPM. In this way the low charge pressure limit PM is provided by one-of-three logic 275 to comparator 273 during the T3 time interval. When T-GT-T3 is low, inverter 416 goes high disabling NOR gate 413 and keeping SPL low at the output of flipflop 279.3. The low output of NOR gate 413 also disables NOR gate 427, thus disabling the low pressure limit decision signal P-LT-PL. The high output from NOR gate 415 enables NOR gate 429. Since a Q output high from flipflop 407 indicates refrigerant pressure P lower than a pressure limit, no inverter 423 is needed at the input of NAND gate 429. Thus, the Q output from flipflop 407 is directly coupled to NAND gate 429 which is enabled during time period T3 for producing the output low charge pressure comparison signal P-LT-PM.

When time has elapsed longer than T3, the feed back signal T-GT-T3 goes high, disabling NOR gate 415 and putting signal SPM low and disabling NAND gate 429. Inverter 416 provides an output low, making the output of NOR gate 413 high. The high output of NOR gate 413 enables NAND gate 427 and turns on the signal SPL from flipflop 279.3. Signal SPL causes the low pressure limit PL corresponding to the blower voltage $V_{BL}$ to be presented for comparison at comparator 273. Then a digital comparison is clocked out through flipflop 407 of FIG. 20 through NAND gate 427 and inverter 431 as the low pressure comparison signal P-LT-PL.

Figure 22:
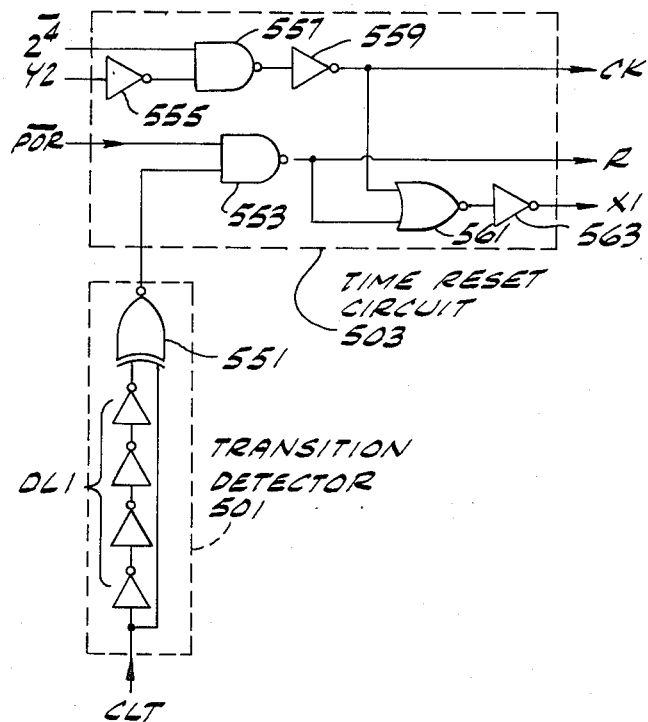
FIG. 22 is a logic circuit diagram of a time reset circuit and a transition detector for FIG. 21.

In FIG. 22 the bipolar transition detector 501 and time reset circuit 503 of FIG. 21 are described in greater detail. Bipolar transition detector 501 includes exclusive-NOR gate 551 and delay circuit DL1 comprised of 4 series-connected inverters. An exclusive-NOR gate is a circuit which has an output Low only when its two inputs are different in logic level. These components act to provide an output Low whenever clutch control signal CLT has either a rising or a falling transition. When clutch control signal CLT rises, a High arrives at exclusive-NOR gate 551 slightly before the delayed High reaches the other input through circuit DL1. As a result, the output of exclusive-NOR gate 551 is temporarily driven low by the rising transition but then rises high as soon as the delay in circuit DL1 has elapsed. When CLT has a falling transition, the new Low is immediately provided to exclusive-NOR gate 551 at one input. However, the previous high of clutch control signal CLT is still propagating through delay circuit DL1. Accordingly, exclusive-NOR circuit 551 responds to the condition that each input be different from the other and provides an output low indicative of the falling transition. When no transition is occurring, exclusive-NOR gate 551 provides an output High.

In time reset circuit 503 a transition detector 501 output Low produces an output High from NAND gate 553 for timer resetting at output R. The 7-bit divider circuit 505 of FIG. 21 counts up in response to the clock output CK of time reset circuit 503, which in turn is driven by the 16 Hertz pulses $2^4$-bar provided by 6 bit divider 265 at its Q-bar output in FIG. 14. As a reliability precaution, 7-bit divider 505 of FIG. 21 is only permitted to count up to the longer of time periods T1 or T2. In the embodiment illustrated, predetermined time period T1 is assumed to be longer than T2, and the output Y2 of an illustratively 8-second decoder 509 is fed to time reset circuit 503. When output Y2 goes high after time period T1, inverter 555 has an output Low which disables NAND gate 557. The 7-bit divider 505 no longer counts since decoder 509 output Y2 prevents it until clutch control signal CLT has a transition and resets divider 505 through the reset output R of time reset circuit 503 of FIG. 22. On the other hand, during the counting and before time T1 has elapsed, output Y2 is low, and NAND gate 557 is enabled so that the time base signal $2^4$-bar passes through NAND gate 557 and inverter 559 without logic change to the clock input of divider 505.

The X1 output of the time reset circuit 503 is a precautionary inhibit signal for preventing any possibility of erroneous outputs from decoders 507, 509, and 511 during transitions in the clutch control signal CLT and during settling of the 7-bit divider 505 when it is being incremented. When transition detector 501 has an output Low indicative of a transition in the clutch signal CLT, NAND gate 553 is forced high, which in turn forces the output X1 high through NOR gate 561 and inverter 563. Inhibit signal X1 is also generated as a high output when time base signal $2^4$-bar is high at the same time as output Y2 is Low from decoder 509. In other words, during the predetermined time period T1, when Y2 is low, the inhibit signal X1 will be generated when time base signal $2^4$-bar is high. Since it is rising transitions of $2^4$-bar that are incrementing the 7-bit divider 505, it is desirable to inhibit the decoding process until the 7-bit divider 505 has settled.

Figure 23A:
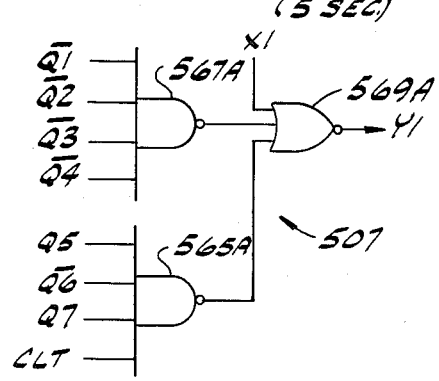
FIGS. 23A, 23B and 23C are logic circuit diagrams of timing decoders for FIG. 21 respectively.
Figure 23B:
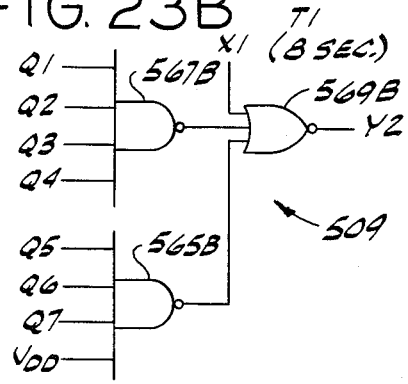
Figure 23C:
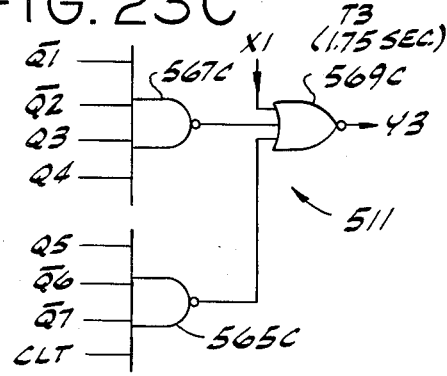

FIGS. 23A, 23B, and 23C illustrate the T2 second decoder 507, T1 decoder 509, and T3 decoder 511 used in FIG. 21. Each decoder of FIGS. 23A, 23B, and 23C has NAND gates 565 and 567 indicated with a letter suffix corresponding to the letter suffix of its drawing Figure. The NAND gates 565 and 567 feed a NOR gate 569 producing outputs Y1, Y2, and Y3 respectively in the FIGS. 23A, 23B, and 23C. The T2 decoder of FIG. 23A is wired to provide Y1 high when 5 seconds have elapsed. This is accomplished by recognizing that 7-bit divider 505 of FIG. 21 is fed with time base pulses at the rate of 16 per second by the input signal $2^4$-bar. Since 7-bit divider 505 is a 7-bit counter, the output at the 5th, 6th and 7th bits changes state every 1, 2, and 4 seconds respectively. Thus, the outputs from the flipflops (not shown) in 7-bit divider 505 are binary numbers in electrical form representing the time to be decoded in seconds. The NAND gate 565 and 567 inputs are connected to the Q output of a given flipflop in divider 505 when the decoder should respond to a 1 at that bit position and to the Q-bar output of a given flipflop when the decoder is to respond to a 0 at the bit position. Thus, in FIG. 23A, Q5 high, Q6-bar high and Q7 high correspond to the binary number "101" (decimal 5), that is, 5 seconds. The Q-bar outputs are wired to NAND gate 567A for the Q1 through Q4 lowest bit positions since no fractional seconds are being decoded in decoder 507. In FIG. 23B all of the Q outputs 1 through 7 of 7-bit divider 505 are wired to the NAND gates 565B and 567B. Thus, decoder 509 will respond by providing an output Y2 when divider 505 has counted up to all ones, which occurs in 8 seconds. In FIG. 23C the decoder 511 is wired to respond to Q5, Q6-bar and Q7-bar which occurs after 1 second. The least significant bits Q1-bar, Q2-bar, Q3 and Q4 are wired so that a fractional time after the 1 second point causes response by this T3 decoder 511.

Figure 24:
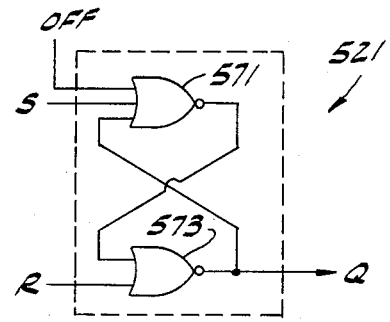
FIG. 24 is a logic circuit diagram of a flipflop for producing the clutch control signal in FIG. 21.

FIG. 24 shows the logic diagram for the flipflop 521 of FIG. 21. It is a dual NOR gate flipflop with NOR gate 571 having two set inputs, one for the signal OFF and the other for the output of NAND gate 539 of FIG. 21. Each of the NOR gates 571 and 573 is fed by the output of the other. NOR gate 573 is also fed by AND gate 533 at reset input R and provides the Q output of flipflop 521.

Figure 25:
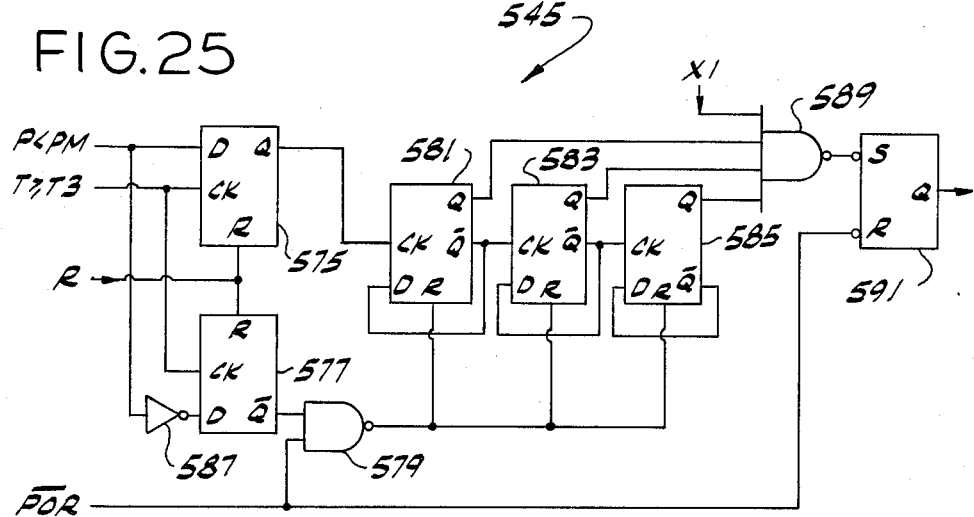
FIG. 25 is a logic circuit diagram of a count detector for a low charge circuit in FIG. 21.

In FIG. 25 the count detector 545 responds to the low charge pressure comparison signal P-LT-PM and the low charge time signal T-GT-T3. When power is first turned on, power-on-reset pulse POR-bar goes low, resetting flipflops 575, 577, 581,583, and 585 through NAND gate 544 of FIG. 21 and NAND gate 579 of FIG. 25. Then POR-bar goes high and remains high. When the clutch control signal CLT goes low in FIG. 21, the output of NAND gate 544 is driven high, resetting flipflops 575 and 577 of the count detector 545 at the R input. When clutch control signal CLT goes high, the reset is released.

If the low charge pressure comparison signal P-LT-PM indicates that the pressure P has fallen below the low charge pressure limit PM, then the D input of flipflop 575 goes high. If this occurs before the third predetermined time period T3 has elapsed, then the time signal T-GT-T3 clocks flipflop 575 to an output Q high (see steps 721 and 723 of FIG. 27). The high Q output of flipflop 575 signifies an instance of refrigerant low charge. The three stage counter consisting of flip-flops 581, 583, and 585 is clocked by the transition to output Q high at flipflop 575, causing an increase by 1 of the count stored in the counter (step 725 in FIG. 27). Because the counter is clocked by rising transitions, flipflop 575 has its Q output brought back low by being reset during deenergization of clutch 87 when clutch control signal CLT is low. Then each subsequent instance of low charge will clock flipflop 575 high again.

Flipflop 577 is clocked with flipflop 575. The function of flipflop 577 is to reset counter flipflops 581,583,585 when an instance of low charge is not found so that if a series of low charge instances is not consecutive, the low charge detector 545 will not issue a warning prematurely. Accordingly, the output of flipflop 577, unlike flip-flop 575, is arranged so that it does not alternate in output state when consecutive low charge instances are occurring and clutch control signal CLT is alternately going low. The D input of flipflop 577 is provided with the logical complement of the low charge pressure comparison signal P-LT-PM by the inverter 587. When each instance of low charge is being detected in the upper flipflop 575, inverter 587 provides a data input zero to flipflop 577, the Q-bar output of which is clocked to a 1. Subsequent reset when clutch control signal CLT goes low keeps the Q-bar output of flipflop 577 high. NAND gate 579 goes low and stays low so that the counter flip-flops 581, 583, and 585 are released and kept released from reset by the memory action of flipflop 577 so long as output Q-bar of flipflop 577 remains high. However, if a low charge pressure comparison signal P-LT-PM is subsequently a zero, indicating that the instances of apparent low charge occurrence are not consecutive, then the inverter 587 provides a high to the D input of flipflop 577. This results in a Q-bar output Low, forcing NAND gate 579 output high and resetting all of the counter flipflops 581, 583, and 585. The operation just described corresponds to the resetting step 729 in FIG. 27.

If and when a low charge condition has occurred for a predetermined number of consecutive instances, then NAND gate 589 is wired to provide an output zero. The output zero from NAND gate 589 sets flipflop 591 to turn the Q output of the count detector on and keep it on by the memory action of flipflop 591 so that the air conditioning system will be shut off. Flipflop 591 is a dual AND gate flipflop which has low-active set and reset inputs. In the FIG. 25 count detector 545 circuit, NAND gate 589 is wired to each of the Q outputs of flipflops 581, 583, and 585 so that a low charge warning is set into flipflop 591 only after at least 7 consecutive low charge instances at flipflop 575. It should be clear that the NAND gate 589 inputs can be alternatively wired to the Q and Q-bar outputs of the flipflops 581, 583, and 585, so that any predetermined number from 1 to 7 of low charge instances puts the NAND gate 589 in the set condition (step 727 of FIG. 27). Other circuit configurations for low charge detector 545 can be devised based on the principles disclosed herein so that, for instance, a sufficient number of apparent low charge instances among a previous predetermined number of times of clocking flipflop 575 triggers a warning even when some instances are not consecutive.

Figure 26:
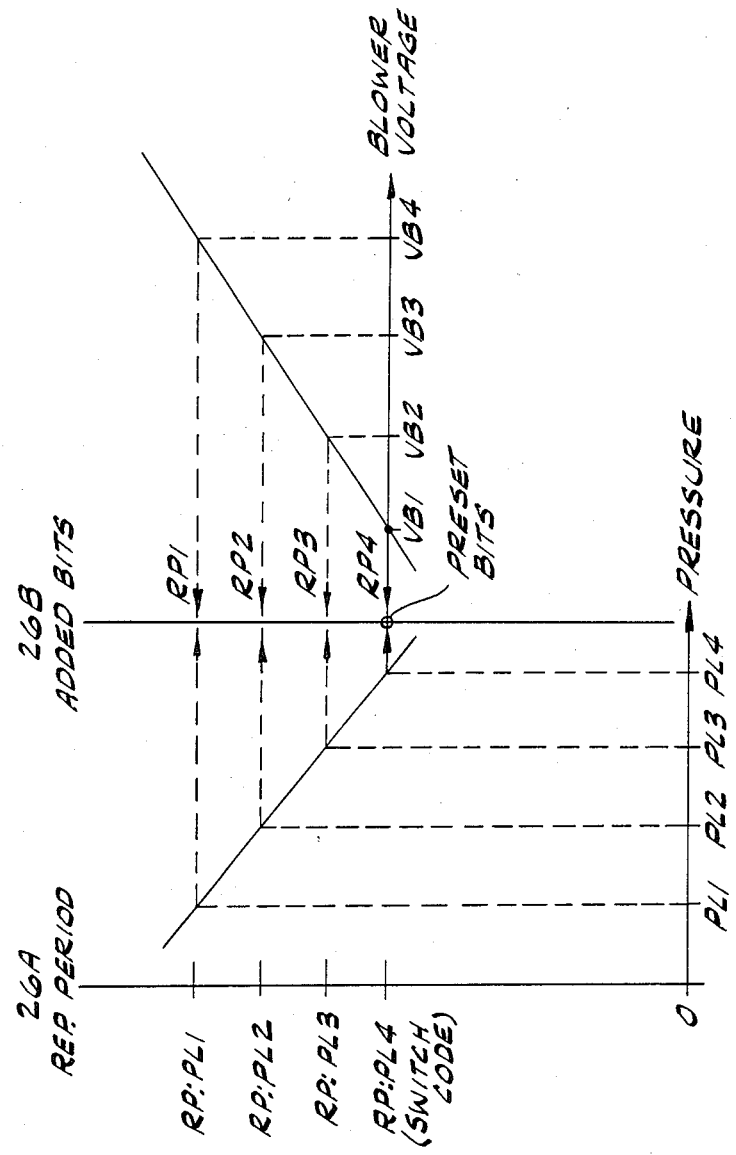
FIG. 26 comprises a pair of related graphs with graph 26A illustrating a plot of pulse repetition period from the transducer circuitry of FIG. 12 versus pressure and with graph 26B illustrating a plot of digital bits added to an up counter 285 in FIG. 14 versus blower-related voltage, graph 26B being raised relative to graph 26A to suggest preset bits in the up counter.

In FIG. 26 a pair of graphs 26A and 26B are provided for illustrating a process of picking component values for the voltage controlled one-shot 281 of FIG. 14 and setting the internal binary code 287 for the highest-pressure one of a plurality of low pressure limit selections for PL, the selections being designated PL1, PL2, PL3, and PL4. Graph 26A shows a characteristic curve of the magnetoelastic pressure-to-repetition-period transducer 150 of FIG. 12. With repetition period on the ordinate and actual refrigerant pressure P on the abscissa, the repetition period is seen to be a decreasing function of the refrigerant pressure P. At the highest-pressure selection, PL4, the repetition period expressed as a binary number is made to be the preset bits of internal code 287. Graph 26B shows on the ordinate the added bits RP4, RP3, RP2, and RP1 needed in addition to the present bits from internal code 287 in order to make the preset up counter 285 provide the proper binary repetition period values RP:PL4, RP:PL3, RP:PL2, RP:PL1 for each of the selections PL4, PL3, PL2, and PL1 to be made in response to the several blower-voltage-related pin VB voltages VB1, VB2, VB3, and VB4 respectively. Added bits RP4 are zero or a relatively small binary number.

The graphs 26A and 26B read together show that when the preferred embodiment is properly constructed, the bits which are added by voltage controlled one-shot 281 (FIG. 14) to the preset bits in preset up counter 285 produce sums which are respectively equal to the binary numbers which are counted and held in up counter 263 corresponding to the repetition rate at each of the plurality of selectable low pressure limits PL1, PL2, PL3, and PL4. In order to build the circuitry, the repetition period counts held in counter 263 are determined experimentally when known pressure values PL1, PL2, PL3, and PL4 of refrigerant pressure P are applied to the magnetoelastic transducer circuitry 150 of FIG. 12. The binary number in counter 263 corresponding to the repetition period of the highest-pressure one (PL4) of the low pressure limits is then reproduced as the hardwired internal code 287. This is the number identified as RP:PL4 in graph 26A. Next the voltage controlled one-shot 281 of FIG. 16 has resistors R21 and R23 selected so that the voltage VD1 is equal to the voltage VB1 at pin VB corresponding to the lowest voltage value of blower voltage $V_{BL}$ to be encountered. Setting voltage VD1 amounts to setting the x-axis intercept of the straight line of graph 26B. The slope of the straight line is determined by selection of the resistor R25 of FIG. 16. Making R25 smaller increases the current I and thus causes capacitor C25 to charge up faster. The faster C25 charges, the shorter is the period of time 289 (FIG. 14A) for up-counting in graph 26B. Thus, decreasing the resistance of resistor R25 decreases the slope of the straight line in graph 26B. Conversely, increasing the resistance of resistor R25 increases the slope of the straight line.

While the preferred embodiment has been disclosed in terms of particular circuitry for a custom integrated circuit chip, it will be understood by the skilled worker that the invention can be provided in a variety of circuitry forms. For instance, the invention is suitably implemented by use of a microprocessor chip for providing the various functions of the circuitry under programmed control so that different functions, timing periods and pressure limits can be changed merely by software changes. It is envisioned, for instance, that such changes would be implemented on a read only memory (ROM) and then for different applications, different ROMs are respectively provided in the smart pressure switch.

FIG. 27 not only illustrates the method of operation of the custom integrated circuit version disclosed as the preferred embodiment herein but also may be used by the skilled worker as a flowchart for programming a microprocessor chip to accomplish smart pressure switch functions. The method embodiment disclosed begins with turning on power at step 701. Step 703 initializes variables. Index J for counting instances of low charge is set to 0. The number of consecutive low charge instances required to produce a warning is programmed as a predetermined number N such as 6. Next operations proceed to send an output signal to stop the compressor at step 705, and then to set a timer to T=0 and start it running at step 707. The first predetermined time period is tested at step 709, and when it has elapsed the pressure P is tested to determine whether it equals or exceeds the high pressure limit PH at branch 711. When the high pressure limit PH is exceeded, the compressor is started at step 713 by issuing the appropriate electrical command signal. The timer is again set to T=0 and started counting once again at step 715.

Low charge checking occurs at steps 721 through 729. When the third predetermined time interval T3 has elapsed at branch 721, the pressure P is tested to determine whether it has fallen below the low charge pressure level PM at branch 723. (Steps 721 and 723 are equivalent to comparing the electrical signal representing the refrigerant pressure P with another electrical signal corresponding to a low charge pressure limit PM when the clutch is engaged and time period T3 is elapsing.) If not, the low charge index J is reset to 0 at step 729. If the pressure P has fallen below the low charge pressure level PM, the low charge index J is incremented by 1 at step 725 and compared with the predetermined number N at branch 727. If number N has been reached or exceeded, the clutch is disengaged in response to the comparing because of the repeated instances of refrigerant pressure P falling below the low charge pressure limit PM within the time period T3, the compressor is stopped at step 731 and the warning light LD1 is turned on at step 733, ending the operation of the airconditioning system at END 735. Step 733 effectively signals an abnormal low charge condition of the air conditioning apparatus when there occurs a rate of change in pressure P, and correspondingly in value of the digital signal corresponding thereto, in excess of a predetermined rate of change.

On the other hand, if at branch 727 the low charge index J does not yet equal or exceed the predetermined number N, operations proceed to step 739. At step 739 the pressure P is read. Also at step 739, the low pressure limit value for limit PL is determined by table lookup or calculation after reading the air conditioner setting of High (H), Medium High (MH), Medium Low (ML), or Low (L) which has been selected on the blower voltage switch. When elapsed time on the timer reaches the second predetermined interval T2 at branch 741, then the pressure P is compared with the selected low pressure level PL at step 743. Because of steps 709 and 741 the operation of engaging the clutch 87 and thereby starting the compressor is timed so that the clutch is engaged only after a first predetermined time period T1 following disengagement, and so that the clutch is disengaged only after a second predetermined time period T2 following engagement. In this way the operation of the heat transfer air conditioning system is constrained to change between on and off only after a predetermined interval T1 or T2 from the next previous change. Until the pressure P falls below limit PL the system cycles through steps 739, 741, and 743 until the air-conditioning system has reduced the refrigerant pressure P below PL. Then a branch is made from step 743 back to step 705 and the compressor is stopped. This completes a cycle of operation which occurs over and over again in the air-conditioning system of FIG. 10 by the use of the smart pressure switch 1.

Figure 28:
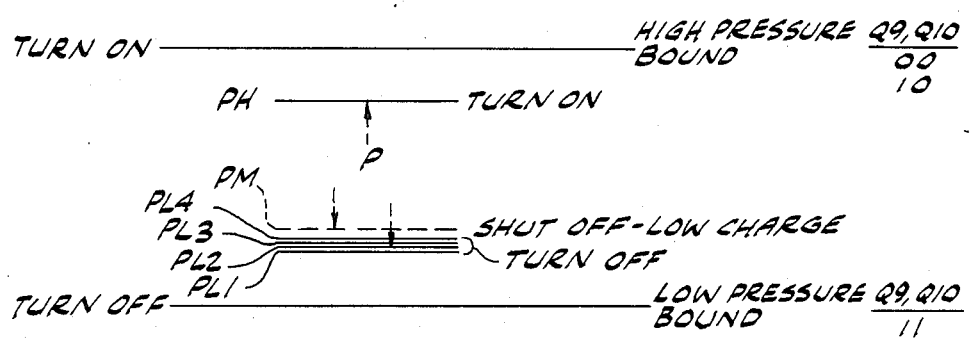
FIG. 28 is a diagram of pressure levels illustrating a method for responding to high and low pressure bounds as accomplished by the circuitry in FIG. 20 and for responding to intermediate pressure limits or levels.

FIG. 28 illustrates the operation of the inventive pressure switch 1 as the refrigerant pressure P rises and falls under its control. In normal operation of the air conditioning system of FIG. 10, the refrigerant pressure P rises in the suction line 81 when the clutch 87 is deenergized. When high pressure limit PH is reached, the clutch 87 is energized by smart pressure switch 1, air conditioner compressor 81 is turned on and the refrigerant pressure P falls until it reaches the value of low pressure limit PL2 which has been selected from among values PL1, PL2, PL3, and PL4. Then smart pressure switch 1 deenergizes clutch 87, turning off air conditioner compressor 81. Refrigerant pressure P again rises to high pressure limit PH and the cycle is repeated.

If the refrigerant pressure P falls from high pressure limit PH to low charge pressure limit PM in less than a preestablished period of time, and a sufficient number of consecutive instances of such behavior occur, then the air conditioning system is shut off on the presumption of low refrigerant charge.

If some instance of malfunction in the circuitry of FIG. 21 occurs, so that smart pressure switch 1 does not react to the refrigerant pressure P reaching the high pressure limit PH and one of the selected low pressure limit values normally, then the High Pressure Bound and Low Pressure Bound of FIG. 28 come into play. If and when refrigerant pressure P rises above level PH and reaches the High Pressure Bound, the pressure condition logic of FIGS. 20 and 21 operates to send the high pressure comparison signal and cause the clutch 87 to be energized and for compressor 81 to turn on. If and when refrigerant pressure P falls below all of the selectable low pressure limit values PL1, PL2, PL3, and PL4, and falls as low as the Low Pressure Bound, the pressure condition logic of FIGS. 20 and 21 operates to send the low pressure comparison signal and cause the clutch 87 to be deenergized and for compressor 81 to turn off. In this way the operation of the air conditioning system of FIG. 10 can be retained at some adequate level until the smart pressure switch 1 can be replaced.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for sensing pressure at a source thereof comprising:
   a housing with fluid pressure responsive means movable therein for defining therewith an expansible chamber means for communication with the pressure source; and
   a transducer comprising a body of magnetoelastic material of generally annular form positioned within said housing and having magnetic properties which vary as a function of the stress to which said annular body is subjected, said annular body being stressed in response to movement of said fluid pressure responsive means, said transducer including means responsive to the stress-induced changes in the magnetic properties thereof for producing an electrical signal having a value which is a function of the magnitude of the fluid pressure, means for accepting and retaining a sector of said annular body and movable with said fluid pressure responsive means, a cradle arranged in said housing to accept and retain a generally diametrically opposite sector of said annular body so that an increase in the fluid pressure in said expansible chamber means tends to compress said annular body between said accepting and retaining means and said cradle, and said cradle having a portion thereof shaped to form a bobbin on which is wound at least one coil comprising said means for producing the electrical signal.

2. A device as set forth in claim 1 wherein said accepting and retaining means comprises an actuator moved by said fluid pressure responsive means.

3. A device as set forth in claim 1 wherein said fluid pressure responsive means comprises a diaphragm.

4. A device as set forth in claim 1 which further includes adjusting means positioned between said housing and said cradle for varying the stress applied to said annular body by said cradle thereby to calibrate the device.

5. A device as set forth in claim 1 wherein those components thereof, which in response to a temperature-induced dimensional change would increase the stress on said annular body, are formed of materials and of dimensions which will effect an additive thermal expansion which is substantially equal to that of those components thereof which, in response to a temperature-induced dimensional change, would decrease the stress on said annular body whereby the calibration of said device is substantially unaffected by temperature changes.

6. A device as set forth in claim 1 wherein those components which, in response to an increase in temperature, expand to effect an increase in the stress on said annular body are formed of materials and of dimensions that will effect an additive thermal expansion which is substantially equal to that of all of those components thereof which, in response to an increase in temperature, expand to effect a decrease in the stress on said annular body whereby the calibration of said device is substantially unaffected by temperature changes.

7. A device as set forth in claim 4 wherein with the pressure in said expansible chamber at a predetermined pressure, said adjusting means prestresses said annular body.

8. A device as set forth in claim 2 which further includes means for limiting the travel of said actuator in the event of an increase in pressure in said expansible chamber in excess of a preselected value.

9. A device as set forth in claim 2 wherein said actuator and said cradle have opposing surfaces so shaped that when a compressive force is applied to said annular body it tends to deform as the portions thereof within said cradle and said actuator assume shapes in conformity with those of the opposing surfaces of said actuator and said cradle so that compressive forces are applied over diametrically opposite substantial portions of the periphery of said annular body.

10. A device as set forth in claim 9 wherein said actuator and said cradle have respective opposing recesses which are concave in shape and have a curvature less than that of said annular body.

11. A device as set forth in claim 1 which further includes electrical circuitry within said housing comprising means responsive to said electrical signal for providing an output to control the operation of electrical apparatus.

12. A control device comprising:
a housing;
a generally annular body of magnetoelastic material having magnetic properties which vary as a function of stress to which said body is subjected;
means positioned within said housing for receiving and retaining a sector of said body at least adjacent a diameter of said body;
means operable generally in response to an applied force thereon for transmitting the applied force onto said body and generally in a diametrical direction thereacross against said receiving and retaining means so as to effect the stressing of said body; and
means wound about at least a part of said receiving and retaining means and at least a part of said sector of said body for at least in part opposing displacement thereof and for producing an electrical control signal having a value which is a function of stress-induced changes in said body upon the applied force operation of said applied force transmitting means.

13. A control device as set forth in claim 12 wherein said applied force transmitting means includes another means arranged generally in opposed relation with said first named receiving and retaining means within said housing for receiving and retaining another sector of said body at least adjacent the diameter thereof and generally diametrically opposite said first named sector of said body.

14. A control device as set forth in claim 13 wherein each of said first-named and another receiving and retaining means has seating means for respective sectors of the core, said seating means being so shaped that when a compressive force is applied to the annular body it tends to deform it.

15. A control device for sensing the magnitude of fluid pressure of a source thereof and producing an electrical control signal as a function of the magnitude of the fluid pressure, the control device comprising:
housing means for connection to the fluid pressure source;
fluid pressure responsive means movable in said housing means for defining therewith expansible chamber means for communication with the fluid pressure source;
a transducer in said housing means and including a generally annular body of magnetoelastic material having magnetic properties which vary as a function of stress-induced changes in said annular body to produce the electrical control signal when said annular body is stressed; and
a pair of means for receiving and retaining generally diametrically opposite sectors of said annular body, respectively, one of said receiving and retaining means being associated with said fluid pressure responsive means and movable in said housing means in response to variations in the fluid pressure of the fluid pressure source toward and away from the other of said receiving and retaining means thereby to variably stress said annular body and produce the electrical control signal, said other receiving and retaining means comprising a cradle having a portion thereof shaped to form a bobbin on which is wound at least one coil comprising means for producing the electrical signal.

16. A control device as set forth in claim 15 which further includes adjusting means positioned between said housing and said cradle to vary the stress applied to said annular body by said cradle thereby to calibrate the control device.

17. A control device as set forth in claim 16 wherein with the pressure in said expansible chamber means at a predetermined pressure, said adjusting means prestresses said annular body.

18. A control device as set forth in claim 15 wherein said annular body is positioned within a second chamber of said housing means and is maintained at ambient pressure.

19. A device for controlling the operation of an air conditioning system having a compressor, means for driving the compressor, a pressure line for conducting compressed refrigerant from the compressor, and a suction line for returning expanded refrigerant to the compressor, the device comprising:

a housing with fluid pressure responsive means movable therein for defining therewith expansible chamber means for communication with the suction line to sense the magnitude of the refrigerant pressure in the suction line;

a transducer comprising a body of magnetoelastic material of generally annular form, the magnetic properties of which vary as a function of the stress to which said body is subjected, said body being stressed in response to the expansion and contraction of said expansible chamber means, said transducer including means responsive to the stress-induced changes in the magnetic properties thereof for producing an electrical signal having a value which is a function of the magnitude of the refrigerant pressure in the suction line, means for accepting and retaining a sector of said body and movable with said fluid pressure responsive means, and cradle means arranged in said housing for accepting and retaining a generally diametrically opposite sector of said body so that an increase in the refrigerant pressure in said expansible chamber means tends to compress said body between said accepting and retaining means and said cradle means; and means responsive to the electrical signal attaining a first value representing a first predetermined refrigerant pressure for energizing the compressor and thereafter reaching a second value representing a second predetermined refrigerant pressure for de-energizing the compressor, said energizing and deenergizing means comprising logic circuitry within said housing means responsive to the electrical signal to control the conductivity of a solid state switching device operable for selectively energizing and deenergizing the compressor driving means, said solid state switching device generating heat during operation, and said housing means being in heat exchange relationship with the returning expanded refrigerant whereby heat generated by said solid state switching device is dissipated in the returning refrigerant thereby to cool said solid state switching device.

20. A smart pressure switch for sensing fluid pressure at a fluid pressure source comprising:

a housing with fluid pressure responsive means movable therein for defining therewith expansible chamber means for communication with the fluid pressure source;

a transducer comprising a body of magnetoelastic material, the magnetic properties of which vary as a function of the stress to which said body is subjected, said body being associated with said fluid pressure responsive means within said housing so that an increase in the fluid pressure in said expansible chamber means moves said fluid pressure responsive means to compress and thereby stress said body;

means disposed within said housing for supporting a part of said body;

said transducer including at least one conductor means wound about a part of said supporting means and a part of said body and operable generally in response to changes in the magnetic properties of said body upon the stressing thereof for producing an electrical signal having a value which is a function of the fluid pressure in said expansible chamber means; and electrical circuitry within said housing and connected in circuit relation with said at least one conductor means, said electrical circuitry comprising logic means responsive to the electrical signal for controlling the conductivity of a solid state switching device for selectively energizing and deenergizing electrical apparatus.

21. A smart pressure switch as set forth in claim 20 wherein said logic means is programmed to be responsive to a plurality of preselected values of the electrical signal so that said solid state switching device is selectively energized and deenergized at a plurality of different preselected pressures.

22. An air conditioning system comprising:

a compressor;

electrically energizable means for driving said compressor;

means for conducting refrigerant from said compressor;

means for returning refrigerant to said compressor;

a smart pressure switch comprising a housing with fluid pressure responsive means movable therein for defining therewith expansible chamber means for communication with said returning means so as to sense the magnitude of the refrigerant pressure therein;

a transducer comprising a body of magnetoelastic material, the magnetic properties of which vary as a function of the stress to which said body is subjected, said transducer including means responsive to the stress-induced changes in the magnetic properties thereof for producing an electrical signal having a value which is a function of the refrigerant pressure in said returning means, and said body being mounted within said housing and associated with said fluid pressure responsive means so that an increase in pressure in said expansible chamber means tends to compress said body and effect the stressing thereof;

means responsive to the electrical signal attaining a first value representing a first predetermined pressure for energizing said electrically energizable means and thereafter reaching a second value representing a second predetermined pressure for de-energizing said electrically energizable means; and said energizing and deenergizing means including logic means mounted within said housing and responsive to the electrical signal for controlling the conductivity of a solid state switching device for selectively energizing and deenergizing said clutch, and means for operation in response to the electrical signal attaining a third value representing another predetermined pressure intermediate the first and second predetermined pressures.

23. An air conditioning system as set forth in claim 22 for use with an engine in which said electrically energizable means for driving said compressor comprises an electromagnetic clutch arranged to selectively couple said compressor to the engine.

24. A method of sensing pressure comprising:
  connecting a source of fluid pressure to an expansible chamber defined by a diaphragm movable within a housing;
  mounting within the housing an annular body of magnetoelastic material, the magnetic properties of which vary as a function of the stress to which the body is subjected;
  applying to a sector of the annular body a compressive force which is a function of the pressure being sensed by positioning the annular body between an actuator which receives and retains a sector of the body against a recess of the actuator which is concave in shape and has a curvature less than that of the annular body and is associated with the diaphragm, and a cradle which receives and retains a diametrically opposite sector of the annular body against a recess of the cradle which is concave in shape and has a curvature less than that of the annular body and which is held fixed within the housing thereby to stress the body by a force which is a function of the pressure being sensed;
  limiting the extent to which the actuator can move against the first-named sector of the annular body in the event of pressure in excess of a preselected value in said expansible chamber;
  forming those components which, in response to an increase in temperature, expand to effect an increase in the stress on the annular body, of materials and of dimensions that effect an additive thermal expansion which is substantially equal to that of all of those components thereof which, in response to an increase in temperature, expand to effect a decrease in the stress on the annular body; and
  producing an electrical signal having a value which is a function of the pressure in response to the stress-induced changes in the magnetic properties of the annular body by coupling electrical energy to the body through a coil wound around the cradle.

25. A method as set forth in claim 24 which includes the step of adjustably prestressing the annular body.

26. A method of operating a control device including a generally annular body of magnetoelastic material having magnetic properties which vary in response to stress-induced changes therein to produce an electrical control signal, an actuator and a cradle associated with the body for receiving and retaining a pair of generally diametrically opposite sectors of the body, respectively, and a diaphragm for transmitting an actuating force, the method comprising the steps of:
  adjustably prestressing the body;
  applying the actuating force onto the diaphragm to move the diaphragm and the actuator against one of the diametrically opposite sectors of the body associated with the actuator, limiting the extent to which the diaphragm and the actuator can move against the one sector of the body in the event of actuating force in excess of a preselected value;
  urging the other of the diametrically opposite sectors of the body against the cradle in response to the exertion of the actuating force in the generally diametrical direction onto the one diametrically opposite sector of the body thereby compressing the body between the actuator and the cradle and stressing the body in response to the compression thereof to effect stress-induced changes in the magnetic properties of the magnetoelastic material of the body;
  forming those components from among the housing, the diaphragm, the actuator and the cradle, which, in response to an increase in temperature, expand to effect an increase in the stress on the annular body, of materials and of dimensions that effect an additive thermal expansion which is substantially equal to that of all of those components which, in response to an increase in temperature, expand to effect a decrease in the stress on the annular body; and
  producing an electrical signal having a value which is a function of the pressure in response to the stress-induced changes in the magnetic properties of the annular body by coupling electrical energy to the body through a coil wound around the cradle.

27. A control device comprising:
  a housing having a pressure fluid chamber and at least another chamber therein;
  diaphragm means mounted in said housing between said pressure fluid chamber and said at least another chamber and movable at least in part toward said at least another chamber upon the establishment of fluid pressure of at least a preselected value in said pressure fluid chamber acting on said diaphragm means;
  an abutment in said at least another chamber and engaged with said housing, said abutment having an opening therethrough;
  a transducer in said at least another chamber and including a body of magnetoelastic material having magnetic properties variable as a function of stress imparted to said transducer body;
  means in said at least another chamber and movably associated with said housing for cradling a part of said transducer body disposed therein;
  means movable in said opening of said abutment and engaged with said transducer body at least generally opposite said part thereof disposed in said cradling means and operable generally for imparting stress to said transducer body, said stress imparting means including means for abutting engagement with said abutment at least generally adjacent said opening therethrough, and means for extension in part through said opening in said abutment into engagement with a part of said diaphragm means, said stress imparting means being at least generally conjointly movable with said diaphragm means to stress said transducer body in response to established fluid pressure of the at least preselected value in said pressure fluid chamber acting on said diaphragm means;
  said transducer further including coil means wound about at least a part of said cradling means and said part of said transducer body disposed in said cradling means for retaining said transducer body against displacement from said cradling means and for producing an electrical signal in response to the stress imparted to said transducer body by said stress imparting means upon the conjoint movement thereof with said diaphragm means; and
  means in said housing for applying an adjusting force onto said cradling means for moving it, said transducer body and said stress imparting means toward adjusted positions with said abutting engagement means of said stress imparting means being engaged with said abutment means thereby to adjustably introduce a calibrating stress to said transducer body.

28. A control device comprising:
a housing;
a transducer including a body of a magnetoelastic material having magnetic properties variable as a function of stress imparted to said transducer body;
means arranged in said housing for cradling a part of said transducer body disposed therein;
means movable in said housing and engaged with said transducer body at least generally opposite said part thereof disposed in said cradling means and operable generally for imparting stress to said transducer body; and
said transducer further including coil means wound about at least a part of said cradling means and said transducer body part disposed therein for retaining said transducer body part against displacement from said cradling means and for producing an electrical signal in response to the stress imparted to said transducer body by said stress imparting means upon the movement thereof.

29. A control device as set forth in claim 28 wherein said transducer body comprises a continuous tape of the magnetoelastic material having a plurality of turns thereof defining an annulus thereof.

30. A control device as set forth in claim 29 wherein said transducer body part comprises a sector of said annulus disposed in said cradling means.

31. A control device as set forth in claim 28 further including means operable generally for exerting a force on said stress imparting means to effect the movement thereof in said housing.

32. A control device as set forth in claim 31 wherein said force exerting means includes diaphragm means movable in said housing for engagement with said stress imparting means.

33. A control device as set forth in claim 28 further comprising means adjustably associated with said housing and said cradling means for introducing a calibrating stress into said transducer body.

34. A control device comprising:
a housing;
an assembly removably associated with said housing therewithin and including a transducer body of magnetoelastic material having magnetic properties variable as a function of stress imparted thereto, means removably mounted in said housing for cradling a part of said transducer body, and coil means wound about at least a part of said cradling means and said transducer body part disposed in said cradling means for retaining said transducer body and said cradling means against displacement and operable generally for producing an electrical signal indicative of the stressing of said transducer body when stress is imparted thereto.

35. A control device as set forth in claim 34 further comprising means operable generally for exerting a force onto said transducer body to effect the stressing thereof, said force exerting means being engaged with said transducer body at least generally opposite said transducer body part disposed in said cradling means.

36. A control device as set forth in claim 34 further comprising means for adjustably urging said assembly toward an adjusted position in said housing to introduce a calibrating stress into said transducer body.

37. A method of assembling a control device with the control device including at least a housing, a cradle, a body of magnetoelastic material, and at least one insulated conductor, the method comprising the steps of:
associating the cradle with a part of the magnetoelastic material body;
coiling a part of the at least one insulated conductor about at least a part of the cradle and the magnetoelastic material body part associated therewith and retaining thereby the cradle and the magnetoelastic material body against displacement; and
placing the cradle, the magnetoelastic material body and the at least one insulated conductor coiled about the at least part of the cradle and the magnetoelastic material body associated therewith in a mounted position therefor in the housing.

38. The method as set forth in claim 37 wherein the at least one insulated conductor has a pair of opposite ends and wherein the method comprises the additional step of connecting the opposite ends of the at least one insulated conductor in a circuit, respectively.

39. The method as set forth in claim 38 wherein the housing includes at least one passage means therein for receiving at least one insulated conductor and wherein the connecting step includes passing at least one of the opposite ends of the at least one insulated conductor through the at least one passage means.

40. The method as set forth in claim 37 comprising the additional step of urging at least the cradle and the magnetoelastic material body with the at least one insulated conductor coiled about the at least part of the cradle and the magnetoelastic material body part toward an adjusted position in the housing and introducing thereby a calibrating stress into the magnetoelastic material body.

41. The method as set forth in claim 37 wherein the control device further includes a means for exerting a force on the magnetoelastic material body and wherein the method comprising the additional step of associating the force exerting means with the housing and engaging a part of the force exerting means with another part of the magnetoelastic material body at least generally opposite the first named part thereof associated with the cradle.

42. A method of assembling a control device with the control device including at least a housing having a plurality of wall means for defining at least in part at least one chamber in the housing, at least one opening in one of the wall means connecting with the at least one chamber, a cradle having a stem thereon and also having a generally arcuate recess therein with a pair of generally opposite sidewalls on the cradle defining in part the arcuate recess, a generally annular body of magnetoelastic material with magnetic properties variable as a function of stress imparted thereto and with the annular body having inner and outer circumferential surfaces interconnected by a pair of generally radially extending opposite side edge portions, respectively, and at least one insulated conductor having a pair of opposite ends, the method comprising the steps of:
disposing a sector of the annular body into the arcuate recess of the cradle and seating thereby a part of the outer circumferential surface of the annular body against the cradle within the recess with the opposite sidewalls of the cradle arranged at least adjacent parts of the radially extending opposite side edge portions of the annular body, respectively;

coiling a part of the at least one insulated conductor generally intermediate the opposite ends thereof about at least a part of the cradle and the opposite sidewalls thereof and about at least a part of the inner circumferential surface of the annular body generally at the sector thereof disposed in the recess of the cradle and retaining thereby the cradle and the annular body against displacement; and placing the cradle, the annular body and the at least one insulated conductor within the at least one chamber of the housing and inserting the stem in the cradle into the at least one opening in the one wall means of the housing thereby to dispose the cradle in a mounted position therefor in the at least one chamber.

43. The method as set forth in claim 42 wherein the annular body includes a preselected length of tape of the magnetoelastic material with a pair of opposite side edges on the tape and wherein the method comprises the preliminary step of winding the tape generally spirally upon itself to form the annular body with the opposite side edges of the tape defining the radially extending opposite side edge portions of the annular body, respectively.

44. The method as set forth in claim 42 comprising the additional step of connecting the opposite ends of the at least one insulated conductor in a circuit, respectively.

45. The method as set forth in claim 44 wherein the one wall means of the housing has at least another opening therein and wherein the connecting step includes passing at least one of the opposite ends of the at least one insulated conductor through the at least another opening.

46. The method as set forth in claim 42 wherein the control device further includes an adjusting screw and wherein the method comprises the additional step of engaging the adjusting screw in threaded relation with at least a part of the at least one opening in the one wall means of the housing and in abutment with the stem on the cradle inserted into the at least one opening and adjustably urging thereby at least the cradle and the annular body disposed therein toward an adjusted position in the at least one chamber in the housing to introduce a calibrating stress into the annular body.

47. The method as set forth in claim 46 wherein the control device further includes means for exerting a force on the annular body and wherein the engaging and adjustably urging step includes engaging the force exerting means with another part of the outer circumferential surface of the annular body at least generally opposite the first named part on the outer circumferential surface thereof and seating the force exerting means within the at least one chamber to oppose the adjustable urging of the cradle and annular member toward the adjusted position thereof by the adjusting screw.

48. The method as set forth in claim 42 wherein the control device further includes means for exerting a force on the annular body and wherein the method comprises the additional step of associating the force exerting means with another part of the outer circumferential surface of the annular body at least generally opposite the first named part of the outer circumferential surface thereof seated against the cradle within the recess thereof.

49. A device for sensing fluid pressure at a source thereof comprising:

a housing with fluid pressure responsive means movable therein for defining therewith an expansible chamber means for communication with the fluid pressure source; and a transducer comprising a body of magnetoelastic material of generally annular form positioned within said housing and having magnetic properties which vary as a function of the stress to which said annular body is subjected, said fluid pressure responsive means being movable in response to fluid pressure in said expansible chamber means to effect the stressing of said annular body, said transducer including means responsive to the stress-induced changes in the magnetic properties thereof for producing an electrical signal having a value which is a function of the magnitude of the fluid pressure, means for accepting and retaining a sector of said annular body and movable with said fluid pressure responsive means, a cradle disposed in said housing to accept and retain a diametrically opposite sector of said annular body so that an increase in the fluid pressure in said expansible chamber means tends to compress said annular body between said accepting and retaining means and said cradle, and those components of the device, which in response to a temperature-induced dimensional change would increase the stress on said annular body, being formed of materials and of dimensions which will effect an additive thermal expansion which is substantially equal to that of those components thereof which, in response to a temperature-induced dimensional change, would decrease the stress on said annular body whereby calibration of the device is substantially unaffected by temperature changes.

50. A device for sensing fluid pressure at a source thereof comprising:

a housing with fluid pressure responsive means movable therein for defining therewith an expansible chamber means for communication with the fluid pressure source; and a transducer comprising a body of magnetoelastic material of generally annular form position within said housing and having magnetic properties which vary as a function of the stress to which said annular body is subjected, said annular body being stressed in response to movement of said fluid pressure responsive means, said transducer including means responsive to the stress-induced changes in the magnetic properties thereof for producing an electrical signal having a value which is a function of the magnitude of the fluid pressure, means for accepting and retaining a sector of said annular body and movable with said fluid pressure responsive means, a cradle arranged in said housing to accept and retain a generally diametrically opposite sector of said annular body so that an increase in the fluid pressure in said expansible chamber means tends to compress said annular body between said accepting and retaining means and said cradle, and those components of the device which, in response to an increase in temperature, expand to effect an increase in the stress on said annular body being formed of materials and dimensions that will effect an additive thermal expansion which is substantially equal to that of all of those components of the device which, in response to an increase in temperature, expand to effect a decrease in the stress on said annular body whereby the calibration of said device is substantially unaffected by temperature changes.

51. A device for sensing fluid pressure at a source thereof comprising:
- a housing with fluid pressure responsive means movable therein for defining therewith an expansible chamber means for communication with the fluid pressure source; and
- a transducer comprising the body of magnetoelastic material of generally annular form positioned within said housing and having magnetic properties which vary as a function of the stress to which said annular body is subjected, said annular body being stressed in response to movement of said fluid pressure responsive means, said transducer including means responsive to the stress-induced changes in the magnetic properties thereof for producing an electrical signal having a value which is a function of the magnitude of the fluid pressure, means for accepting and retaining a sector of said annular body and movable with said fluid pressure responsive means, a cradle disposed in said housing to accept and retain a generally diametrically opposite sector of said annular body so that an increase in the fluid pressure in said expansible chamber means tends to compress said annular body between said accepting and retaining means and said cradle, and said accepting and retaining means and said cradle having opposing surfaces in opposing recesses thereof which are generally concave in shape and have a curvature less than that of said annular body so that when a compressive force is applied to said annular body it tends to deform as the portions thereof within said opposing recesses of said accepting and retaining means and said cradle assume shapes in conformity with said opposing surfaces of said opposing recesses wherein the compressive force is applied over diametrically opposite substantial portions of the periphery of said annular body, respectively.

52. A control device for sensing the magnitude of fluid pressure of a source thereof and producing an electrical control signal as a function of the magnitude of the fluid pressure, the control device comprising:
- housing means for connection to the fluid pressure source;
- fluid pressure responsive means movable in said housing means for defining therewith expansible chamber means for communication with the fluid pressure source;
- a transducer in said housing means and including a generally annular body of magnetoelastic material having magnetic properties which vary as a function of stress-induced changes in said annular body to produce the electrical control signal when said annular body is stressed;
- a pair of means for receiving and retaining generally diametrically opposite sectors of said annular body, respectively, one of said receiving and retaining means being associated with said fluid pressure responsive means and movable in said housing means in response to variations in the fluid pressure of the fluid pressure source toward and away from the other of said receiving and retaining means thereby to variably stress said annular body and produce the electrical control signal; and
- electrical circuitry within said housing means comprising means responsive to the electrical control signal for providing an output to control the operation of electrical apparatus.

53. A control device for subjection to the fluid pressure of a fluid pressure source, the control device comprising;
- a housing;
- fluid pressure responsive means movable in said housing for defining therewith expansible chamber means for subjection to the fluid pressure of the fluid pressure source;
- a transducer in said housing comprising a generally annular body of magnetoelastic material having magnetic properties variable as a function of the stress-induced changes in said annular body;
- a pair of means for receiving and retaining said annular body therebetween, one of said receiving and retaining means being associated with said fluid pressure responsive means and movable therewith in response to variations in the fluid pressure in said expansible chamber means acting on said fluid pressure responsive means to compress said annular body against the other of said receiving and retaining means thereby to variably stress said annular body;
- means associated with at least said annular body and responsive to the stress-induced changes in the magnetic properties thereof for producing an electrical signal;
- electrical circuitry within said housing and connected in circuit relation with said electrical signal producing means, said electrical circuitry including logic means responsive to the electrical signal for controlling the conductivity of a solid state switching device; and
- means arranged in said housing for heat transfer relation between said solid state switching device and a heat sink component of the control device.

* * * * *